(12) United States Patent
Thomas et al.

(10) Patent No.: US 11,277,304 B1
(45) Date of Patent: Mar. 15, 2022

(54) WIRELESS DATA PROTOCOL

(71) Applicant: Amazon Technologies, Inc., Seattle, WA (US)

(72) Inventors: Joveen Joseph Thomas, Fremont, CA (US); Michael A Pogue, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 14 days.

(21) Appl. No.: 16/888,615

(22) Filed: May 29, 2020

(51) Int. Cl.
| | |
|---|---|
| *H04L 12/24* | (2006.01) |
| *H04L 12/26* | (2006.01) |
| *H04L 41/0806* | (2022.01) |
| *H04L 43/16* | (2022.01) |
| *H04L 47/34* | (2022.01) |
| *H04L 43/0829* | (2022.01) |

(52) U.S. Cl.
CPC ...... *H04L 41/0806* (2013.01); *H04L 43/0829* (2013.01); *H04L 43/16* (2013.01); *H04L 47/34* (2013.01)

(58) Field of Classification Search
None
See application file for complete search history.

(56) References Cited

U.S. PATENT DOCUMENTS

| | | | | |
|---|---|---|---|---|
| 6,243,846 | B1* | 6/2001 | Schuster | H03M 13/373 714/757 |
| 2011/0106866 | A1* | 5/2011 | Grayson | H04L 63/10 708/200 |
| 2011/0154161 | A1* | 6/2011 | Kim | H03M 13/2918 714/763 |
| 2014/0189470 | A1* | 7/2014 | Hwang | H04L 1/08 714/776 |
| 2016/0212507 | A1* | 7/2016 | Du | H04Q 9/00 |
| 2017/0180066 | A1* | 6/2017 | Buchacher | H04L 69/22 |

\* cited by examiner

*Primary Examiner* — Eunsook Choi
(74) *Attorney, Agent, or Firm* — Lee & Hayes, P.C.

(57) ABSTRACT

Systems and methods for a wireless data protocol are disclosed. For example, a sending device may generate data packets to be sent to a receiving device. The sending device may also generate packet representations to append to the data packets. For example, for a given packet, a representation of two other packets may be generated, such as by utilizing an exclusive or logical operation, and added to the content portion of the given packet. These packets may be sent to the receiving device, which may utilize the packet representations to reconstruct lost packets.

20 Claims, 13 Drawing Sheets

WIRELESS DATA PROTOCOL

BACKGROUND

Electronic devices may be configured to wirelessly send data. Such data may be sent from a sending device to a receiving device in data packets. Described herein are improvements in technology and solutions to technical problems that can be used to, among other things, improve data packet transmission.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
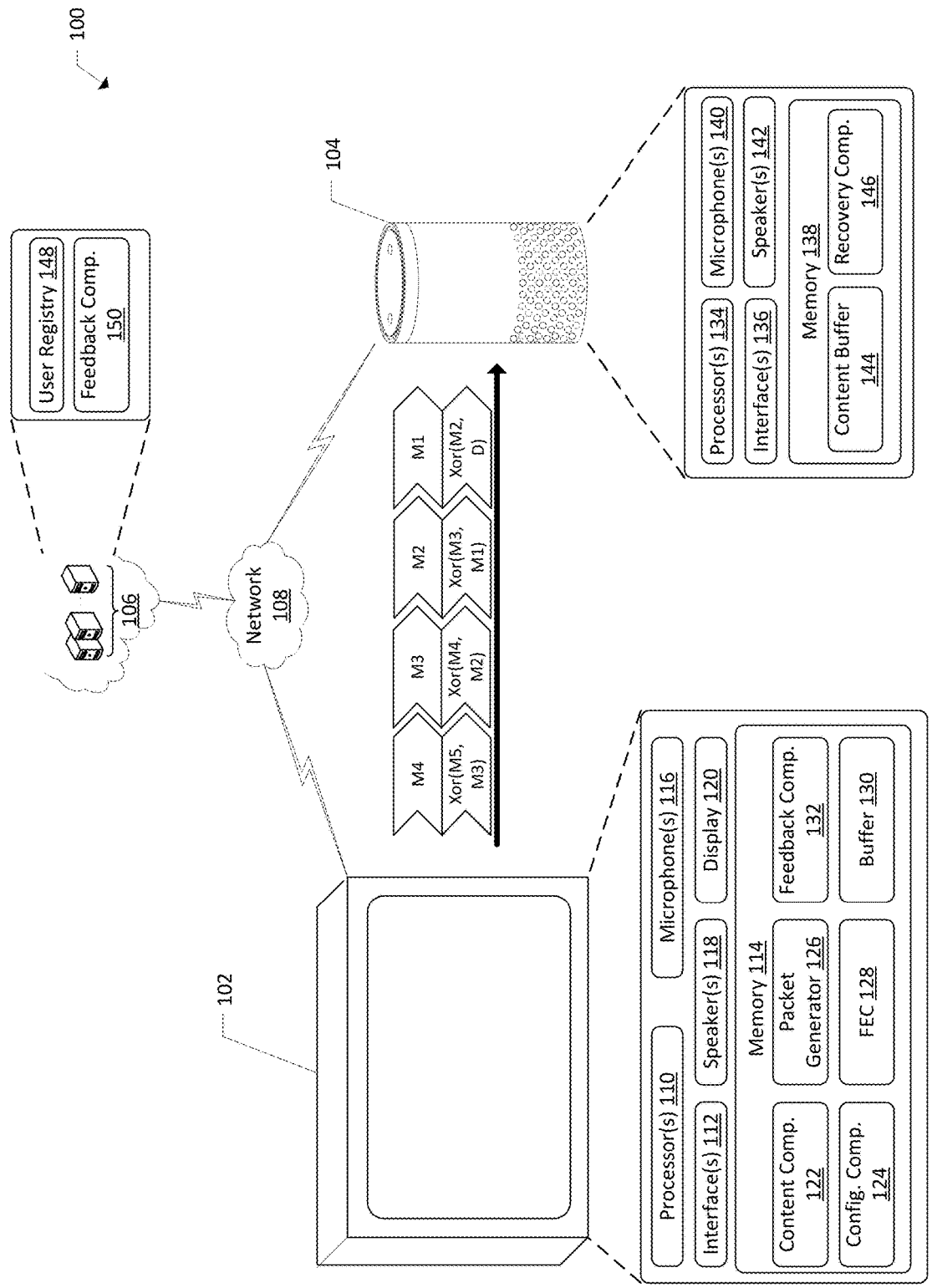
FIG. 1 illustrates a schematic diagram of an example environment for improved packet resiliency associated with a wireless data protocol.

Systems and methods for a wireless data protocol are disclosed. Take, for example, an environment (such as a home, vehicle, office, store, restaurant, or other space) where one or more users may be present. The environments may include one or more electronic devices that may be utilized by the users. For example, the electronic devices may include voice interface devices (e.g., Echo devices, mobile phones, tablets, personal computers, etc.), graphical interface devices (e.g., televisions, set top boxes, virtual/augmented reality headsets, etc.), and/or touch interface devices (tablets, phones, steering wheels, laptops, kiosks, billboard, other devices with buttons, etc.). These electronic devices may be situated in a home, in a place a business, healthcare facility (e.g., hospital, doctor's office, pharmacy, etc.), in vehicle (e.g., airplane, truck, car, bus, etc.) in a public forum (e.g., shopping center, store, etc.), for example.

In examples, at least one of the electronic devices may be configured to receive content data, such as from one or more of the other electronic devices and/or from a remote system. The content data may include various types of content, such as audio data, image data, text data, and/or other data. When the content data includes image data, the electronic device may be configured to display corresponding images. When the content data includes audio data, the electronic device may be configured to output corresponding audio. However, in certain examples, the electronic device may not be configured to present certain types of content. For example, the electronic device may not include a display and thus may not be configured to present images. In still other examples, additional devices associated with the electronic device may be configured to output audio instead of or in addition to the electronic device outputting audio, such as in a whole-home audio configuration. In these and other examples, the electronic device may send all or a portion of the content data to one or more receiving devices for the receiving devices to output corresponding content. It should be understood that while the several examples provided herein illustrate the sending of audio data from the electronic device to one or more receiving devices, such that the receiving devices output corresponding audio while the electronic device, in examples, outputs images associated with the audio data, the generation of data packets and the sending of the same may include data other than audio data.

Generally, when content data is sent between devices, the sending device may generate data packets that include the content data. The data packets may include a header portion that indicates the sequence of the packets as well as, in examples, other identifying information associated with the data packets. The data packets may also include a payload portion that includes, for each individual packet, a portion of the content data. These packets may be sent to the receiving device. However, some packets may be lost during transmission. Packet loss may be defined as occurring when a given packet is not received at all at a receiving device or when a given packet is received at the receiving device but is received too late to be utilized for outputting the content associated with the packet. Packet loss may result from one or more factors, including transmission interference by other devices, physical impedances, network issues, etc. When packets are lost, the quality of the content as output by the receiving device may be impaired. As such, being able to recover lost packets would be beneficial for diminishing the impact lost packets has on content-output quality.

To assist in lost packet recovery, the electronic device may be configured to generate packets that include both content data as well as a representation of other packets that may be lost. For example, a content component of the electronic device may be configured to receive the content data that is to be sent to the receiving device(s). That content data may be received, for example, from a remote system configured to provide the content data, such as in response to a user request for such content data. The user request may be in the form of a voice command, such as when the electronic device includes a voice user interface, and/or in the form of user input data corresponding to user input received at, for example, a graphical user interface of the electronic device.

A configuration component of the electronic device may be configured to determine a configuration of one or more of the receiving devices and/or of the electronic device. For example, the configuration component may be utilized to determine if one or more receiving devices are enabled for outputting at least a portion of the content, such as audio data, while the electronic device outputs images. In still other examples, the sending device may output content of the same type as the receiving device, such as both devices outputting audio. In these examples, an instance of the audio data may be utilized by the sending device to output audio while another instance of the audio data, such as with the packet representations as described herein, may be sent to the receiving device. In these examples, the buffers of both devices may be utilized to temporarily store data packets such that audio may be output by both devices in time synchronization with each other. In still other examples, multiple receiving devices may be configured to output the audio, and in these examples the sending device may send an instance of the audio data to each of the receiving devices. The audio-data packets sent to the receiving devices may include the packet representations as discussed herein. The configuration component may also be utilized to determine a number of the receiving devices and, thus, a number of instances of the audio data and/or portions of the audio data to send to the receiving devices. The configuration component may determine whether data packet generation as described herein may be initiated.

Once the device determines that data packets are to be generated for sending to the receiving device(s), a packet generator may be configured to generate the packets. The packet generator may generate packets that include a header as discuss herein as well as a payload including portions of the data to be sent to the receiving device(s). When generating the data packets, a forward error correction (FEC) component may be utilized to control errors in data transmission between the electronic device and the receiving device(s). For example, the FEC component may encode the data packets and/or data included in the data packets in a redundant way, such as by utilizing error-correcting code that allows the receiving device(s) to detect errors in data transmission and to correct those errors without the electronic device having to send duplicate packets. Specifically, the FEC component may receive the data packets from the packet generator and may generate representations of data packets to append to the data in the data packets. For example, for a given data packet, the FEC component may generate a packet representation that includes a previous packet and a subsequent packet. That packet representation may be appended or otherwise included in the given packet at issue. For example, if five data packets, packets M1 through M5, are to be sent from the electronic device to the receiving device(s), each of the five data packets may have a packet representation appended to them. Take, for example, packet M4 which may include data that precedes the data in M5 and follows the data in M3. The FEC component may generate a representation of a preceding data packet, for example M3, and a subsequent data packet, for example M5. The representation may be generated utilizing an exclusive or (Xor) or otherwise an exclusive disjunction logical operation of the content data of M5 and M3. Such logical operations output as true only when inputs differ. Utilizing a simplified example, if the data associated with the M5 packet was represented as binary code of 10011, and M3 was represented as 11001, the representation of these packets utilizing the Xor logical operation would be 01010. This representation may be appended or otherwise added to data packet M4 before that packet is sent to the receiving device(s). The same process may be repeated for the other packets to be sent. For example, M5 may include Xor(M6,M4), M3 may include Xor(M4,M2), M2 may include Xor(M3,M1), and M1 may include Xor(M2,D), wherein D signifies a dummy packet. The packet generator may be utilized to generate the final packets to be sent to the receiving device(s) with the packet representations appended thereto.

Additionally, the FEC component may be utilized to select a packet configuration to be utilized for generating the packet representations. For example, the example packet configuration illustrated above includes generating packet representations from the packets immediately preceding and immediately following the packet at issue. In other words, for packet M4, the packet representation is of packet M5 and packet M3. However, in other examples, the packet configuration may indicate that packets other than those immediately preceding and following a packet at issue are to be utilized for generating the packet representation. For example, for packet M4, the packet representation may be of packet M6 and packet M2. This alternative packet configuration may be useful in situations where consecutive packet loss frequently occurs with respect to a given receiving device, from a given electronic device, in a given environment, etc. This packet configuration may also be useful when the content being sent is prerecorded and can be buffered, for example at a buffer of the electronic device, for longer periods of time before being sent to the receiving device(s). For example, when a packet configuration is selected that indicates packets other than immediately preceding and following packets are to be utilized, to generate the representation means that the electronic device may wait until additional packets are received and/or generated before being able to use those packets for the representation generation. For example, if the packet configuration indicates that the M6 and M2 packets are to be utilized for the packet representation to be appended to packet M4, the FEC component may wait until the M6 packet is received and/or generated before being able to generate Xor(M6,M2). This introduced latency may be less desirable in situations where the content is, for example, live streaming content but adds to the resiliency of packet transmission. By so doing, the FEC component and/or one or more other components of the electronic device may determine the content type to be sent to the receiving device(s) and/or the historical packet loss to select a packet configuration for generating the packet representations. In these and other examples, the buffer may be utilized to temporarily store data packets for use in generating the packet representations and generating the final packets to be sent to the receiving device(s).

Additionally, a feedback component of the electronic device may be utilized to receive packet-loss data from one or more sources, such as from the receiving device(s) and/or from a remote system. For example, the receiving device(s) may determine which packets are lost from the electronic device. By way of example, each packet may be consecutively numbered and data indicating that numbering may be included in the header portion of the packets. The receiving device(s) may utilize that data to determine an ordering of the packets, such as for correct output of audio when the content data includes audio data. If a packet is lost and/or is not received in time to be utilized for output by the receiving device(s), the receiving device(s) may determine that the received packets do not include at least one of the consecutively-numbered packets. This packet-loss data may be sent to the electronic device, which may utilize this information to select packet configurations. For example, the packet-loss data may indicate that two packets are consecutively lost frequently, such as more than a threshold amount of times, that three or more packets are consecutively lost frequently, and/or that packets are not consecutively lost frequently. The electronic device may receive this packet-loss data and utilize the data to select a packet configuration. For example, when packets are not consecutively lost frequently, the FEC component may select a packet configuration where the packets immediately preceding and following a given packet are used for generating packet representations. When two packets are consecutively lost frequently, the FEC component may select a packet configuration where a packet is skipped for generating packet representations. When three packets are consecutively lost frequently, the FEC component may select a packet configuration where two packets are skipped for generating packet representations.

With respect to the receiving device(s), they may include a content buffer and a recovery component. The content buffer may be utilized to temporarily store received data packets from the electronic device and output content associated with those packets, such as pursuant to a timing parameter when the content is to be output in a synchronous manner with the output of other content by one or more other receiving devices and/or by the electronic device. Additionally, the content buffer may be utilized to store received data packets such that lost packets may be recovered prior to when those lost packets are needed for output.

The recovery component may be configured to determine when and which packets are lost and to attempt to recover or otherwise reconstruct those packets. For example, the data packets may be sent from the electronic device utilizing a packet configuration of $Xor(M_{n+1}, M_{n-1})$. If the lost packet, for example, is M4, then the recovery component may attempt to utilize the Xor data and the other packets to recover the M4 packet. For example, when the packet configuration is $Xor(M_{n+1}, M_{n-1})$, the recovery component may utilize the Xor data from packet M3 as well as the content data from packet M2 to reconstruct the content data from the M4 packet. Likewise, in this example, the recovery component may utilize the Xor data from packet M5 as well as the content data from packet M6 to reconstruct the content data from the M4 packet. In this example, the recovery component may have two opportunities to reconstruct packet M4. The recovered packet may be added to the content buffer and utilized to output the content in turn. By utilizing the methodologies described herein, improved resiliency for packet loss may be achieved without duplicating packets or requesting that lost packets be resent, both of which introduce latency to data transmission.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for improved packet resiliency associated with a wireless data protocol. The system 100 may include, for example, an electronic device 102, which may include a communal device and/or a personal device. In certain examples, the device 102 may be a voice-enabled device (e.g., Echo devices, mobile phones, tablets, personal computers, etc.), a video interface device (e.g., televisions, set top boxes, virtual/augmented reality headsets, etc.), a touch interface device (tablets, phones, laptops, kiosks, billboard, etc.), and/or an accessory device (e.g., lights, plugs, locks, thermostats, appliances, televisions, clocks, smoke detectors, doorbells, cameras, motion/magnetic/other security-system sensors, etc.). The electronic device 102 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, etc.), for example. The system 100 may also include one or more receiving devices 104, which may be electronic devices 102 and/or may be other devices. The receiving devices 104 may be configured to receive data packets from the electronic device 102 and to perform operations associated with reconstruction of lost packets, as described herein. The system 100 may also include one or more personal devices, which may be electronic devices, such as a mobile phone, tablet, laptop, wearable device, and/or other computing device that is specifically associated with a given user profile. The electronic devices 102, receiving devices 104, and the personal devices may be configured to send data to and/or receive data from a remote system 106, such as via a network 108. Additionally, it should be understood that a given space and/or environment may include numerous electronic devices 102 and/or receiving devices 104 and/or personal devices. It should also be understood that when a "space" or "environment" is used herein, those terms mean an area and not necessarily a given room, building, or other structure, unless otherwise specifically described as such.

The electronic devices 102 may include one or more components, such as, for example, one or more processors 110, one or more network interfaces 112, memory 114, one or more microphones 116, one or more speakers 118, and/or one or more displays 120. The microphones 116 may be configured to capture audio, such as user utterances, and generate corresponding audio data. The speakers 118 may be configured to output audio, such as audio corresponding to audio data received from another device and/or the system 104. The displays 120 may be configured to display images corresponding to image data, such as image data received from the remote system 106 and/or one or more other devices, such as the receiving devices 104. It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 108 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices. The memory 114 of the electronic device 102 may include one or more components, such as for example, a content component 122, a configuration component 124, a packet generator 126, a forward error correction (FEC) component 128, a buffer 130, and/or a feedback component 132. Each of these components will be described in detail by way of example below.

The receiving devices 104 may include one or more components, such as for example, one or more processors 134, one or more network interfaces 136, memory 138, one or more microphones 140, and/or one or more speakers 142. The microphones 140 and/or the speakers 142 may be the same or similar to, and/or may perform the same or similar functions as, the microphones 116 and/or the speakers 118 discussed with respect to the electronic device 102. The memory 138 may include one or more components, such as for example, a content buffer 144 and/or a recovery component 146. Each of these components will be described below in detail by way of example.

The remote system 106 may include components such as, for example, a user registry 148 and/or a feedback component 150. While not depicted, the remote system 106 may also include a speech-processing system. It should be understood that while the speech-processing system and the other components are depicted and/or described as separate from each other in FIG. 1, some or all of the components may be a part of the same system. The speech-processing system may include an automatic speech recognition component (ASR) and/or a natural language understanding component (NLU). Each of the components described herein with respect to the remote system 106 may be associated with their own systems, which collectively may be referred to herein as the remote system 106, and/or some or all of the components may be associated with a single system. Additionally, the remote system 106 may include one or more applications, which may be described as skills. "Skills," as described herein may be applications and/or may be a subset of an application. For example, a skill may receive data representing an intent. For example, an intent may be determined by the NLU component and/or as determined from user input via a computing device. Skills may be configured to utilize the intent to output data for input to a text-to-speech component, a link or other resource locator for audio data, and/or a command to a device, such as the electronic device 102.

In instances where a voice-enabled device is utilized, skills may extend the functionality of devices 102, 104 that can be controlled by users utilizing a voice-user interface. In some examples, skills may be a type of application that may be useable in association with accessory devices and may have been developed specifically to work in connection with given accessory devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

The components of the electronic device 102, the receiving device(s) 104, and the remote system 106 are described in detail below. In examples, some or each of the components of the remote system 106 may include their own processor(s), network interface(s), and/or memory. As such, by way of example, the speech-processing system may include and/or be associated with processor(s), network interface(s), and/or memory. The other components of the remote system 106, such as the feedback component 150, may include and/or be associated with different processor(s), network interface(s), and/or memory, or one or more of these components may utilize some or all of the same processor(s), network interface(s), and/or memory utilized by the speech-processing system. These components are described in detail below. Additionally, the operations and/or functionalities associated with and/or described with respect to the components of the remote system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 148 may be configured to determine and/or generate associations between users, user accounts, and/or devices. For example, one or more associations between user accounts may be identified, determined, and/or generated by the user registry 148. The user registry 148 may additionally store information indicating one or more applications and/or resources accessible to and/or enabled for a given user account. Additionally, the user registry 148 may include information indicating device identifiers, such as naming identifiers, associated with a given user account, as well as device types associated with the device identifiers. The user registry 148 may also include information indicating user account identifiers, naming indicators of devices associated with user accounts, and/or associations between devices, such as the devices 102, 104. The user registry 148 may also include information associated with usage of the devices 102, 104. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data. The user registry 148 may also include data indicating which receiving devices 104 are associated with which electronic devices 102 and/or whether a given receiving device 104 is enabled to output content instead of an electronic device 102.

The speech-processing system may be configured to receive audio data from the devices 102, 104 and/or other devices and perform speech-processing operations. For example, the ASR component may be configured to generate text data corresponding to the audio data, and the NLU component may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "play Video A," the NLU component may identify a "play" intent and the payload may be "Video A." In this example where the intent data indicates an intent to play content with a naming indicator of "Video A," the speech-processing system may call one or more speechlets to effectuate the intent. Speechlets, as described herein may otherwise be described as applications and may include functionality for utilizing intent data to generate directives and/or instructions. For example, a content speechlet may be called when the intent indicates that content is to be retrieved for sending to a device. The speechlet may be designated as being configured to handle the intent of sending requested content, for example. The speechlet may receive the intent data and/or other data associated with the user utterance from the NLU component, such as by an orchestrator of the remote system 106, and may perform operations to instruct the device 102, 104 to output the content, for example. The remote system 106 may generate audio data confirming that requested content has been provided, such as by a text-to-speech component. The audio data may be sent from the remote system 106 to the electronic device 102 for output of corresponding audio by the speakers 118 of the device 102.

The various components of the electronic device 102, the receiving devices 104, and the remote system 106 will now be described by way of example. In examples, the electronic device 102 may be configured to receive content data, such as from one or more other devices and/or from a remote system 106. For example, the content component 122 may be configured to receive the content data from the remote system 106. The content data may include various types of content, such as audio data, image data, text data, and/or otherwise multimedia data. When the content data includes image data, the electronic device 102 may be configured to display corresponding images. When the content data includes audio data, the electronic device 102 may be configured to output corresponding audio. However, in certain examples, the electronic device 102 may not be configured to present certain types of content. For example, the electronic device 102 may not include a display and thus may not be configured to present images. In still other examples, the receiving devices 104 associated with the electronic device 102 may be configured to output audio instead of the electronic device 102 outputting audio, such as in a whole-home audio configuration. In these and other examples, the electronic device 102 may send all or a portion of the content data to one or more of the receiving devices 104 for the receiving devices 104 to output corresponding content. It should be understood that while the several examples provided herein illustrate the sending of audio data from the electronic device 102 to one or more receiving devices 104, such that the receiving devices 104 output corresponding audio while the electronic device 102, in examples, outputs images associated with the audio data, the generation of data packets and the sending of the same may include data other than audio data. The user registry 148 of the remote system 106 may be utilized to determine whether there are one or more receiving devices 104 that are configured to output content instead of or in addition to the electronic device. The configuration component 124 of the electronic device 102 may query the user registry 148 for data indicating the device configurations and/or the configuration component 124 may query the receiving devices 104 directly for configuration information.

Generally, when content data is sent between devices, the sending device may generate data packets that include the content data. The data packets may include a header portion that indicates the sequence of the packets as well as, in examples, other identifying information associated with the data packets. The data packets may also include a payload portion that includes, for each individual packet, a portion of the content data. In certain transmission protocols, the packets may be sent to the receiving device 104, which may receive the packets. However, some packets may be lost during transmission. Packet loss may result from one or more factors, including transmission interference by other devices, physical impedances, network issues, etc. When packets are lost, the quality of the content as output by the receiving device 104 may be impaired. As such, being able to recover lost packets would be beneficial for diminishing the impact lost packets has on content-output quality.

To assist in lost packet recovery, the electronic device 102 may be configured to generate packets that include both content data as well as a representation of other packets that may be lost. For example, the content component 122 may be configured to receive the content data that is to be sent to the receiving device(s) 104. That content data may be received, for example, from the remote system 106 configured to provide the content data, such as in response to a user request for such content data. The user request may be in the form of a voice command, such as when the electronic device 102 includes a voice user interface, and/or in the form of user input data corresponding to user input received at, for example, a graphical user interface of the electronic device 102.

The configuration component 124 may be configured to determine a configuration of one or more of the receiving devices 104 and/or of the electronic device 102. For example, the configuration component 124 may be utilized to determine if one or more receiving devices 104 are enabled for outputting at least a portion of the content, such as audio data, while the electronic device 102 outputs images. The configuration component 124 may also be utilized to determine a number of the receiving devices and, thus, a number of instances of the audio data and/or portions of the audio data to send to the receiving devices 104. The configuration component 124 may determine whether data packet generation as described herein may be initiated.

Once the device 102 determines that data packets are to be generated for sending to the receiving device(s) 104, the packet generator 126 may be configured to generate the packets. The packet generator 126 may generate packets that include a header as discuss herein as well as a payload including portions of the data to be sent to the receiving device(s) 104. When generating the data packets, the FEC component 128 may be utilized to control errors in data transmission between the electronic device 102 and the receiving device(s) 104. For example, the FEC component 128 may encode the data packets and/or data included in the data packets in a redundant way, such as by utilizing error-correcting code that allows the receiving device(s) 104 to detect errors in data transmission and to correct those errors without the electronic device 102 having to send duplicate packets. Specifically, the FEC component 128 may receive the data packets from the packet generator 126 and may generate representations of data packets to append to the data in the data packets. For example, for a given data packet, the FEC component 128 may generate a packet representation that includes a previous packet and a subsequent packet. That packet representation may be appended or otherwise included in the given packet at issue. For example, if five data packets, packets M1 through M5, are to be sent from the electronic device 102 to the receiving device(s) 104, each of the five data packets may have a packet representation appended to them. Take, for example, packet M4 which may include data that precedes the data in M5 and follows the data in M3. The FEC component 128 may generate a representation of a preceding data packet, for example M3, and a subsequent data packet, for example M5. The representation may be generated utilizing an "exclusive or" (Xor) or otherwise an exclusive disjunction logical operation of the content data of M5 and M3. Such logical operations output as true only when inputs differ. Utilizing a simplified example, if the data associated with the M5 packet was represented as binary code of 10011, and M3 was represented as 11001, the representation of these packets utilizing the Xor logical operation would be 01010. This representation may be appended or otherwise added to data packet M4 before that packet is sent to the receiving device(s) 104, and the representation may be described as Xor(M5,M3). The same process may be repeated for the other packets to be sent. For example, M5 may include Xor(M6,M4), M3 may include Xor(M4,M2), M2 may include Xor(M3,M1), and M1 may include Xor(M2,D), wherein D signifies a dummy packet. The packet generator 126 may be utilized to generate the final packets to be sent to the receiving device(s) 104 with the packet representations appended thereto.

Additionally, the FEC component 128 may be utilized to select a packet configuration to be utilized for generating the packet representations. For example, the example packet configuration illustrated above includes generating packet representations from the packets immediately preceding and following the packet at issue. In other words, for packet M4, the packet representation is of packet M5 and packet M3. However, in other examples, the packet configuration may indicate that packets other than those immediately preceding and following a packet at issue are to be utilized for generating the packet representation. For example, for packet M4, the packet representation may be of packet M6 and packet M2. This alternative packet configuration may be useful in situations where consecutive packet loss frequently occurs with respect to a given receiving device 104, from a given electronic device 102, in a given environment, etc. This packet configuration may also be useful when the content being sent is prerecorded and can be buffered, for example at the buffer 130 of the electronic device 102, for longer periods of time before being sent to the receiving device(s) 104. For example, when a packet configuration is selected that indicates packets other than immediately preceding and following packets are to be utilized, the electronic device 102 may wait until additional packets are received and/or generated before being able to use those packets for the representation generation. For example, if the packet configuration indicates that the M6 and M2 packets are to be utilized for the packet representation to be appended to packet M4, the FEC component 128 may wait until the M6 packet is received and/or generated before being able to generate Xor(M6,M2) for packet M4. This introduced latency may be less desirable in situations where the content is, for example, live streaming content. By so doing, the FEC component 128 and/or one or more other components of the electronic device 102 may determine the content type to be sent to the receiving device(s) 104 and/or the historical packet loss to select a packet configuration for generating the packet representations. In these and other examples, the buffer 130 may be utilized to temporarily store data packets for use in generating the packet representations and generating the final packets to be sent to the receiving device(s) 104.

Additionally, the feedback component 132 may be utilized to receive packet-loss data from one or more sources, such as from the receiving device(s) 104 and/or from the remote system 106, such as from the feedback component 150 of the remote system 106, which may store feedback data associated with the receiving device(s) 104 and/or one or more other receiving devices that are not associated with the electronic device 102 but share characteristics, such as device type, with the receiving device(s) 104. For example, the receiving device(s) 104 may determine which packets are lost from the electronic device 102. By way of example, each packet may be consecutively numbered and data indicating that numbering may be included in the header portion of the packets. The receiving device(s) 104 may utilize that data to determine an ordering of the packets, such as for correct output of audio when the content data includes audio data. If a packet is lost and/or is not received in time to be utilized for output by the receiving device(s) 104, the receiving device(s) 104 may determine that the received packets do not include at least one of the consecutively-numbered packets. This packet-loss data may be sent to the electronic device 102, which may utilize this information to select packet configurations. For example, the packet-loss data may indicate that two packets are consecutively lost frequently, such as more than a threshold amount of times, that three or more packets are consecutively lost frequently, and/or that packets are not consecutively lost frequently. The electronic device 102 may receive this packet-loss data and utilize the data to select a packet configuration. For example, when packets are not consecutively lost frequently, the FEC component 128 may select a packet configuration where the packets immediately preceding and following a given packet are used for generating packet representations. When two packets are consecutively lost frequently, the FEC component 128 may select a packet configuration where a packet is skipped for generating packet representations. When three packets are consecutively lost frequently, the FEC component 128 may select a packet configuration where two packets are skipped for generating packet representations.

With respect to the receiving device(s) 104, they may include the content buffer 144 and the recovery component 146. The content buffer 144 may be utilized to temporarily store received data packets from the electronic device 102 and output content associated with those packets, such as pursuant to a timing parameter when the content is to be output in a synchronous manner with the output of other content by one or more other receiving devices 104 and/or by the electronic device 102. Additionally, the content buffer 144 may be utilized to store received data packets such that lost packets may be recovered prior to when those lost packets are needed for output.

The recovery component 146 may be configured to determine when and which packets are lost and to attempt to recover or otherwise reconstruct those packets. For example, the data packets may be sent from the electronic device 102 utilizing a packet configuration of Xor(Mn+1,Mn−1). If the lost packet, for example, is M4, then the recovery component 146 may attempt to utilize the Xor data and the other packets to recover the M4 packet. For example, when the packet configuration is Xor(Mn+1,Mn−1), the recovery component 146 may utilize the Xor data from packet M3 as well as packet M2 to reconstruct the content data from the M4 packet. Likewise, in this example, the recovery component 146 may utilize the Xor data from packet M5 as well as packet M6 to reconstruct the content data from the M4 packet. In this example, the recovery component 146 may have two opportunities to reconstruct packet M4. The recovered packet may be added to the content buffer 144 and utilized to output the content in turn. By utilizing the methodologies described herein, improved resiliency for packet loss may be achieved without duplicating packets or requesting that lost packets be resent, both of which introduce latency to data transmission.

It should be noted that while text data is described as a type of data utilized to communicate between various components of the remote system 106 and/or other systems and/or devices, the components of the remote system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102.

As shown in FIG. 1, several of the components of the remote system 106 and the associated functionality of those components as described herein may be performed by one or more of the electronic devices 102 and/or the receiving devices 104. Additionally, or alternatively, some or all of the components and/or functionalities associated with the electronic devices 102 and/or receiving devices 104 may be performed by the remote system 106.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110, 134, and/or the processor(s) described with respect to the components of the remote system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110, 134, and/or the processor(s) described with respect to the components of the remote system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110, 134, and/or the processor(s) described with respect to the components of the remote system 106 may possess its own local memory, which also may store program components, program data, and/or one or more operating systems.

The memory 114, 138, and/or the memory described with respect to the components of the remote system 106 may include volatile and nonvolatile memory, removable and non-removable media implemented in any method or technology for storage of information, such as computer-readable instructions, data structures, program component, or other data. Such memory 114, 138, and/or the memory described with respect to the components of the remote system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114, 138, and/or the memory described with respect to the components of the remote system 106 may be implemented as computer-readable storage media ("CRSM"), which may be any available physical media accessible by the processor(s) 110, 134, and/or the processor(s) described with respect to the remote system 106 to execute instructions stored on the memory 114, 138, and/or the memory described with respect to the components of the remote system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114, 138, and/or the memory described with respect to the components of the remote system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 112, 136, and/or the network interface(s) described with respect to the components of the remote system 106 may enable messages between the components and/or devices shown in system 100 and/or with one or more other polling systems, as well as other networked devices. Such network interface(s) 112, 136, and/or the network interface(s) described with respect to the components of the remote system 106 may include one or more network interface controllers (NICs) or other types of transceiver devices to send and receive messages over the network 108.

For instance, each of the network interface(s) 112, 136, and/or the network interface(s) described with respect to the components of the remote system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112, 136, and/or the network interface(s) described with respect to the components of the remote system 106 may include a wide area network (WAN) component to enable message over a wide area network.

In some instances, the remote system 106 may be local to an environment associated the electronic devices 102 and/or receiving devices 104. For instance, the remote system 106 may be located within one or more of the electronic devices 102 and/or receiving devices 104. In some instances, some or all of the functionality of the remote system 106 may be performed by one or more of the electronic devices 102 and/or receiving devices 104. Also, while various components of the remote system 106 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device in a home and/or office environment, a self-driving automobile, a bus, an airplane, a camper, a trailer, and/or other similar object having a computer to perform its own sensor processing, etc.

Figure 2:
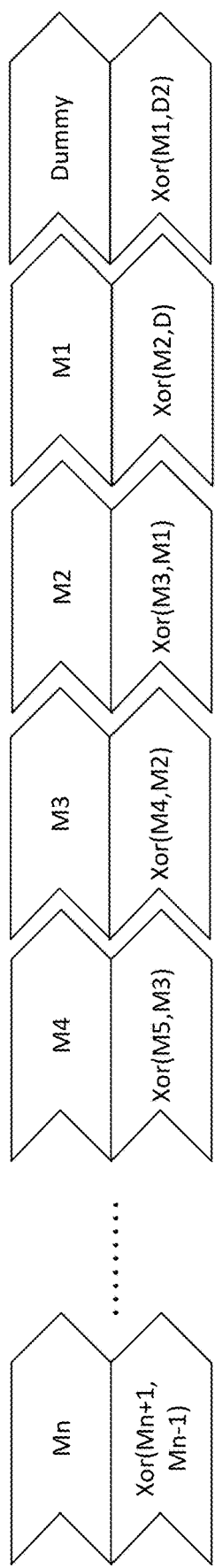
FIG. 2 illustrates a conceptual diagram of data packets generated for improved packet resiliency associated with a wireless data protocol.

FIG. 2 illustrates a conceptual diagram of data packets generated for improved packet resiliency associated with a wireless data protocol. FIG. 2 depicts data packets that each include content data and a packet representation of other data packets. The packet representation has been generated utilizing a packet configuration by a FEC component of an electronic device configured to send the data packets to one or more receiving devices.

The packet configuration utilized with respect to FIG. 2 is for packet Mn, the appended Xor data includes Xor(Mn+1, Mn−1). In other words, the packet representation to be appended to packet Mn includes a representation of the packet Mn+1 and the packet Mn−1. For example, if four data packets, packets M1 through M4, are to be sent from the electronic device to the receiving device(s), each of the four data packets may have a packet representation appended to them. Take, for example, packet M4 which may include data that precedes the data in M5 and follows the data in M3. The FEC component may generate a representation of a preceding data packet, for example M3, and a subsequent data packet, for example M5. The representation may be generated utilizing the Xor or otherwise an exclusive disjunction logical operation of the content data of M5 and M3. Such logical operations output as true only when inputs differ. Utilizing a simplified example, if the data associated with the M5 packet was represented as binary code of 10011, and M3 was represented as 11001, the representation of these packets utilizing the Xor logical operation would be 01010. This representation may be appended or otherwise added to data packet M4 before that packet is sent to the receiving device(s), and the representation may be described as Xor (M5,M3). The same process may be repeated for the other packets to be sent. For example, M3 may include Xor(M4, M2), M2 may include Xor(M3,M1), and M1 may include Xor(M2,D), wherein D signifies a dummy packet. A packet generator may be utilized to generate the final packets to be sent to the receiving device(s) with the packet representations appended thereto.

Figure 3:
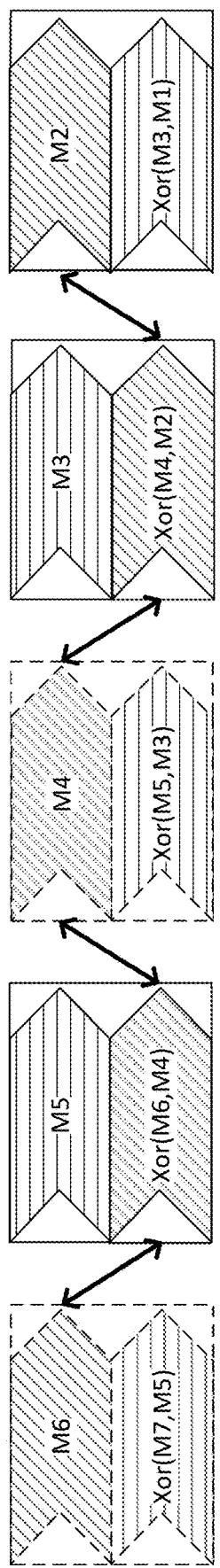
FIG. 3 illustrates a conceptual diagram of a packet configuration for improved packet resiliency associated with a wireless data protocol.

FIG. 3 illustrates a conceptual diagram of a packet configuration for improved packet resiliency associated with a wireless data protocol. FIG. 3 depicts data packets that each include content data and a packet representation of other data packets. The packet representation has been generated utilizing a packet configuration by a FEC component of an electronic device configured to send the data packets to one or more receiving devices.

As shown in FIG. 3, the packet representations have been generated utilizing a packet configuration of Xor(Mn+1, Mn−1). In this example, the packet representations are associated with the immediately preceding and immediately following data packets for packet Mn. Once generated, these packets, which include the content data and the appended Xor data, may be sent from the electronic device to one or more receiving devices.

A recovery component of the receiving device may be configured to determine when and which packets are lost and to attempt to recover or otherwise reconstruct those packets. For example, the data packets may be sent from the electronic device utilizing a packet configuration of Xor (Mn+1,Mn−1). If the lost packet, for example, is M4, then the recovery component may attempt to utilize the Xor data and the other packets to recover the M4 packet. For example, when the packet configuration is Xor(Mn+1,Mn−1), the recovery component may utilize the Xor data from packet M3 as well as packet M2 to reconstruct the content data from the M4 packet. Likewise, in this example, the recovery component may utilize the Xor data from packet M5 as well as packet M6 to reconstruct the content data from the M4 packet. In this example, the recovery component may have two opportunities to reconstruct packet M4. The recovered packet may be added to the content buffer and utilized to output the content in turn. By utilizing the methodologies described herein, improved resiliency for packet loss may be achieved without duplicating packets or requesting that lost packets be resent, both of which introduce latency to data transmission.

As shown in FIG. 3, the data packets may be linked in the form of a linked list and the lost packets in the link may be recovered as long as the packets with Xor data of the lost packets is available and the packet needed to recover the lost packets from the Xor data is either available or can be recovered from its related packets. This disclosure also includes, processes for recovery of packets when scattered packet loss occurs, such as when several packets are lost but those packets are not consecutively lost. To do so, the system may use recovered data to recover more audio data, provided that the receiving device has enough latency, such as based on the amount of buffered data and the ability to buffer data without output quality being impacted, to recover packets recursively. For example, if a packet configuration of Xor (Mn+1,Mn−1) is utilized and packets M6 and M4 are lost, a reconstructed version of packet M6 may be utilized to reconstruct M4, and vice versa. For example, the M6 packet may be reconstructed utilizing the Xor data from packet M7 and the content data from packet M8. With the M6 packet now being reconstructed, the M4 packet may be reconstructed from the Xor data from packet M5 and the content from reconstructed packet M6. While a packet configuration of Xor(Mn+1,Mn−1) is used here as an example, other packet configurations as discussed herein may also be used.

Figure 4:
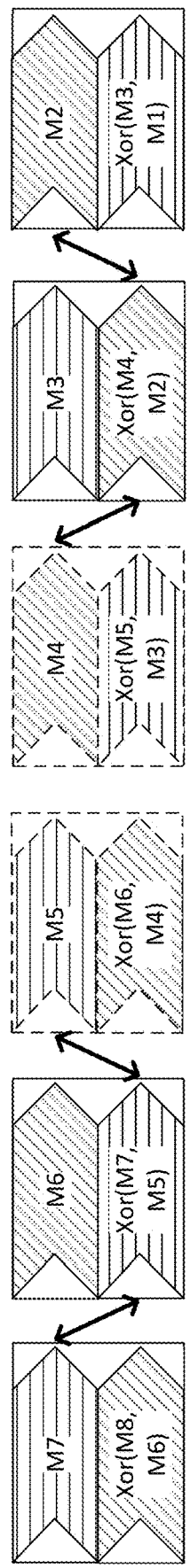
FIG. 4 illustrates a conceptual diagram of packet reconstruction when consecutive packets are lost.

FIG. 4 illustrates a conceptual diagram of packet reconstruction when consecutive packets are lost. FIG. 4 depicts data packets that each include content data and a packet representation of other data packets. The packet representation has been generated utilizing a packet configuration by a FEC component of an electronic device configured to send the data packets to one or more receiving devices.

As shown in FIG. 4, the packet representations have been generated utilizing a packet configuration of Xor(Mn+1, Mn−1). In this example, the packet representations are associated with the immediately preceding and immediately following data packets for packet Mn. Once generated, these packets, which include the content data and the appended Xor data, may be sent from the electronic device to one or more receiving devices.

In this example, two consecutive packets, packets M5 and M4, have been lost. This is depicted in FIG. 4 as broken lines making up the boarders of M5 and M4. A recovery component of the receiving device may be configured to determine when and which packets are lost and to attempt to recover or otherwise reconstruct those packets. For example, the data packets may be sent from the electronic device utilizing a packet configuration of Xor(Mn+1,Mn−1). If the lost packet, for example, is M4, then the recovery component may attempt to utilize the Xor data and the other packets to recover the M4 packet. For example, when the packet configuration is Xor(Mn+1,Mn−1), the recovery component may utilize the Xor data from packet M3 as well as packet M2 to reconstruct the content data from the M4 packet. However, in this example where the M5 packet is also lost, the recovery component may be unable to utilize the Xor data from packet M5 to reconstruct the content data from the M4 packet. In this example, the recovery component may have one opportunity to reconstruct packet M4. Additionally, in this example where the M5 packet is also lost, the recovery component may utilize the Xor data from the M6 packet and packet M7 to recover the M5 packet, but may not be able to utilize the M4 packet because it was also lost. The recovered packet may be added to the content buffer and utilized to output the content in turn. By utilizing the methodologies described herein, improved resiliency for packet loss may be achieved without duplicating packets or requesting that lost packets be resent, both of which introduce latency to data transmission.

Figure 5A:
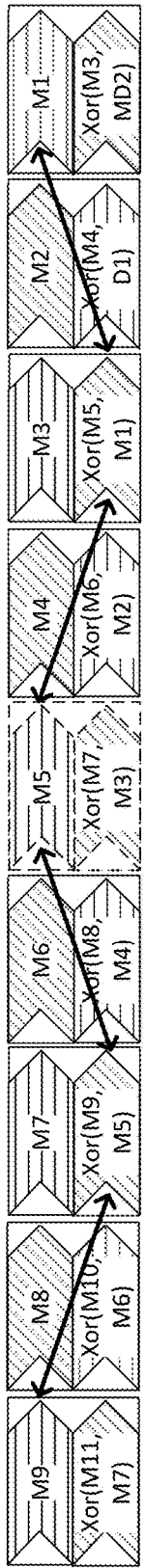
FIG. 5A illustrates a conceptual diagram of another packet configuration for improved packet resiliency associated with a wireless data protocol.

FIG. 5A illustrates a conceptual diagram of another packet configuration for improved packet resiliency associated with a wireless data protocol. FIG. 5A depicts data packets that each include content data and a packet representation of other data packets. The packet representation has been generated utilizing a packet configuration by a FEC component of an electronic device configured to send the data packets to one or more receiving devices.

As shown in FIG. 5A, the packet representations have been generated utilizing a packet configuration of Xor(Mn+2,Mn−2). In this example, the packet representations are associated with the second preceding and second following data packets for packet Mn. Once generated, these packets, which include the content data and the appended Xor data, may be sent from the electronic device to one or more receiving devices.

In this example, packet M5 has been lost. This is depicted in FIG. 5A as broken lines making up the boarders of M5. A recovery component of the receiving device may be configured to determine when and which packets are lost and to attempt to recover or otherwise reconstruct those packets. For example, the data packets may be sent from the electronic device utilizing a packet configuration of Xor (Mn+2,Mn−2). If the lost packet, for example, is M5, then the recovery component may attempt to utilize the Xor data and the other packets to recover the M5 packet. For example, when the packet configuration is Xor(Mn+2,Mn−2), the recovery component may utilize the Xor data from packet M3 as well as packet M1 to reconstruct the content data from the M5 packet. The recovery component may also utilize the Xor data from packet M7 as well as packet M9 to reconstruct the content from the M5 packet. The recovered packet may be added to the content buffer and utilized to output the content in turn. By utilizing the methodologies described herein, improved resiliency for packet loss may be achieved without duplicating packets or requesting that lost packets be resent, both of which introduce latency to data transmission. It should be understood that while the packet configuration shown in FIG. 5A is Xor(Mn+2,n−2), additional packet configurations are included herein, such as Xor(Mn+3,Mn−3), Xor(Mn+4,n−4), etc.

Figure 5B:
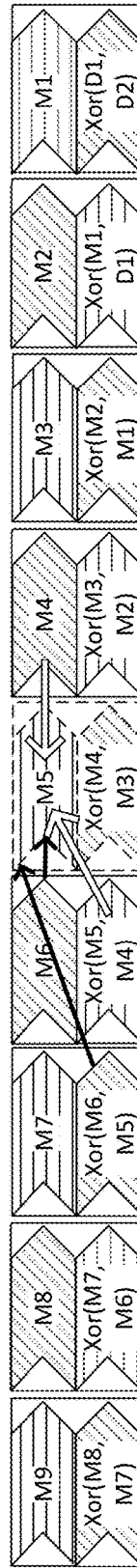
FIG. 5B illustrates a conceptual diagram of another packet configuration for improved packet resiliency associated with a wireless data protocol.

FIG. 5B illustrates a conceptual diagram of another packet configuration for improved packet resiliency associated with a wireless data protocol. FIG. 5B depicts data packets that each include content data and a packet representation of other data packets. The packet representation has been generated utilizing a packet configuration by a FEC component of an electronic device configured to send the data packets to one or more receiving devices.

As shown in FIG. 5B, the packet representations have been generated utilizing a packet configuration of Xor(Mn−1,Mn−2). In this example, the packet representations are associated with the first and second preceding packets for packet Mn. Once generated, these packets, which include the content data and the appended Xor data, may be sent from the electronic device to one or more receiving devices.

In this example, packet M5 has been lost. This is depicted in FIG. 5B as broken lines making up the boarders of M5. A recovery component of the receiving device may be configured to determine when and which packets are lost and to attempt to recover or otherwise reconstruct those packets. For example, the data packets may be sent from the electronic device utilizing a packet configuration of Xor (Mn−1,Mn−2). If the lost packet, for example, is M5, then the recovery component may attempt to utilize the Xor data and the other packets to recover the M5 packet. For example, when the packet configuration is Xor(Mn−1,Mn−2), the recovery component may utilize the Xor data from packet M6 as well as packet M4 to reconstruct the content data from the M5 packet. The recovery component may also utilize the Xor data from packet M7 as well as packet M6 to reconstruct the content from the M5 packet. The recovered packet may be added to the content buffer and utilized to output the content in turn. By utilizing the methodologies described herein, improved resiliency for packet loss may be achieved without duplicating packets or requesting that lost packets be resent, both of which introduce latency to data transmission. It should be understood that while the packet configuration shown in FIG. 5B is Xor(Mn−1,n−2), additional packet configurations are included herein, such as Xor(Mn+1,Mn+2), Xor(Mn−2, Mn−4), etc.

Figure 5C:
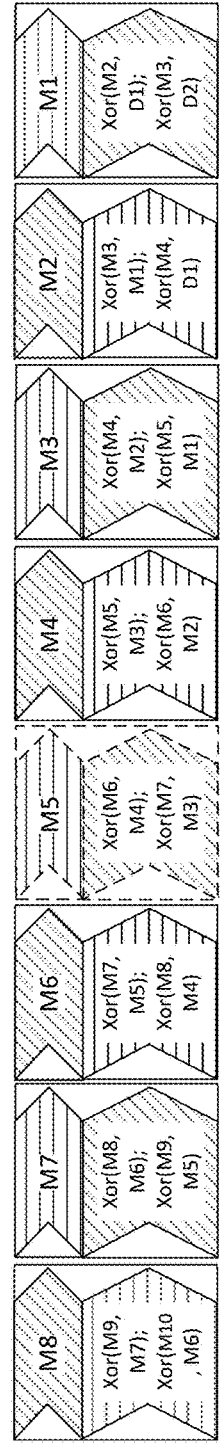
FIG. 5C illustrates a conceptual diagram of another packet configuration for improved packet resiliency associated with a wireless data protocol.

FIG. 5C illustrates a conceptual diagram of another packet configuration for improved packet resiliency associated with a wireless data protocol. FIG. 5C depicts data packets that each include content data and multiple packet representation of other data packets. The packet representations have been generated utilizing a packet configuration by a FEC component of an electronic device configured to send the data packets to one or more receiving devices.

As shown in FIG. 5C, the packet representations have been generated utilizing a packet configuration of Xor(Mn−1,Mn+1) and Xor(Mn−2,Mn+2). In this example, the packet representations are associated with the first and second preceding packets for packet Mn as well as the first and second subsequent packets for packet Mn. Once generated, these packets, which include the content data and the appended Xor data, may be sent from the electronic device to one or more receiving devices.

As noted in FIG. 5C, multiple packet representations may be appended to a given packet and each of the packet representations may be associated with different packet configurations. For example, as shown in FIG. 5 C, packet M5 may include Xor data for packets M6 and M4 utilizing a packet configuration of Xor(Mn−1,Mn+1) as well as Xor data for packets M7 and M3 utilizing a packet configuration of Xor(Mn−2,Mn+2). Using packet M5 as an example lost packet, it may be recovered by the receive device utilizing the Xor data from packet M6 and the content from packet M7, and/or from the Xor data from packet M4 and the content from packet M3, and/or from the Xor data from packet M7 and the content from packet M9, and/or the Xor data from packet M3 and the content from packet M1. In this example, there are multiple opportunities to reconstruct the M5 packet, if lost.

Figure 6:
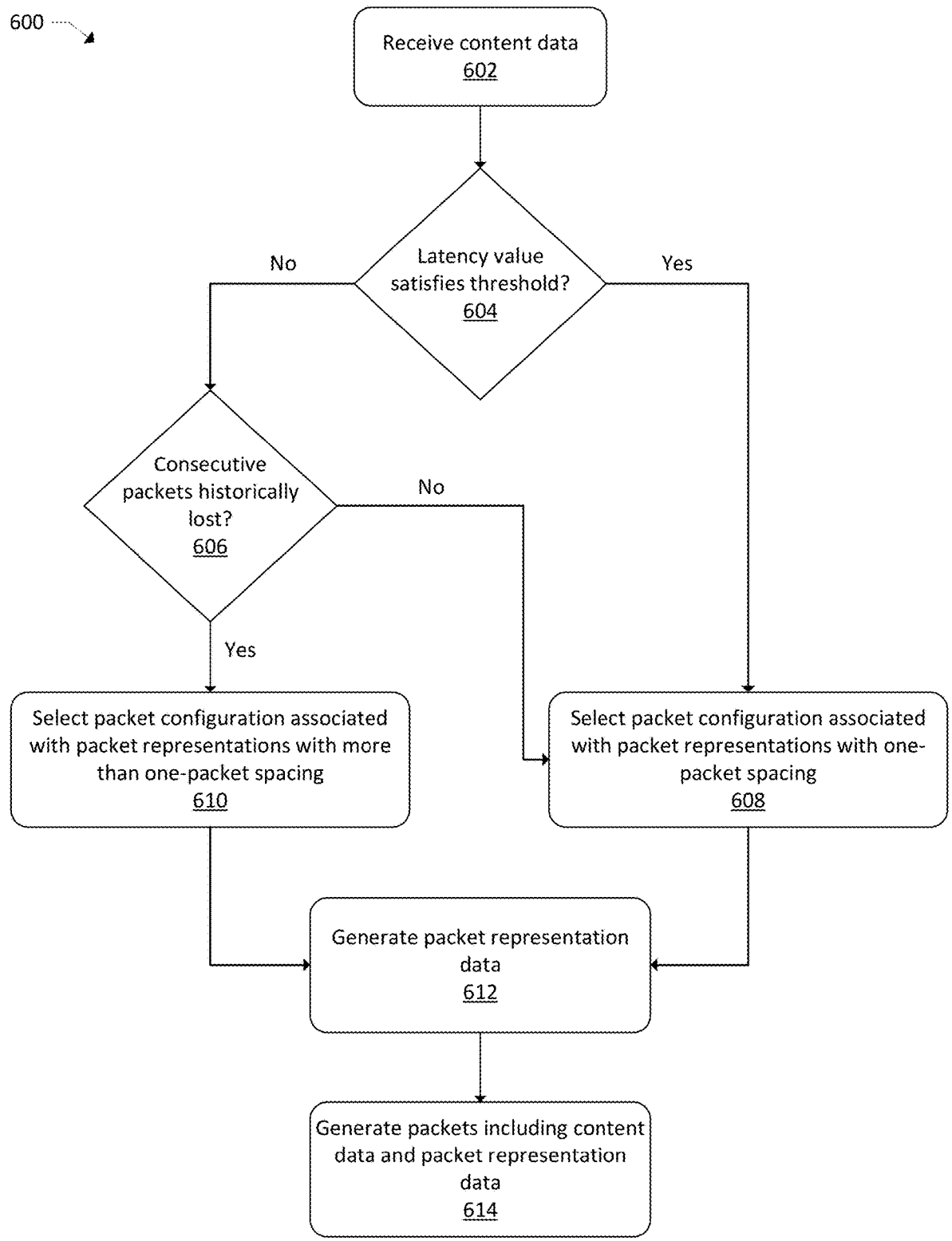
FIG. 6 illustrates a flow diagram of an example process for selecting a packet configuration for improved packet resiliency associated with a wireless data protocol.
Figure 7:
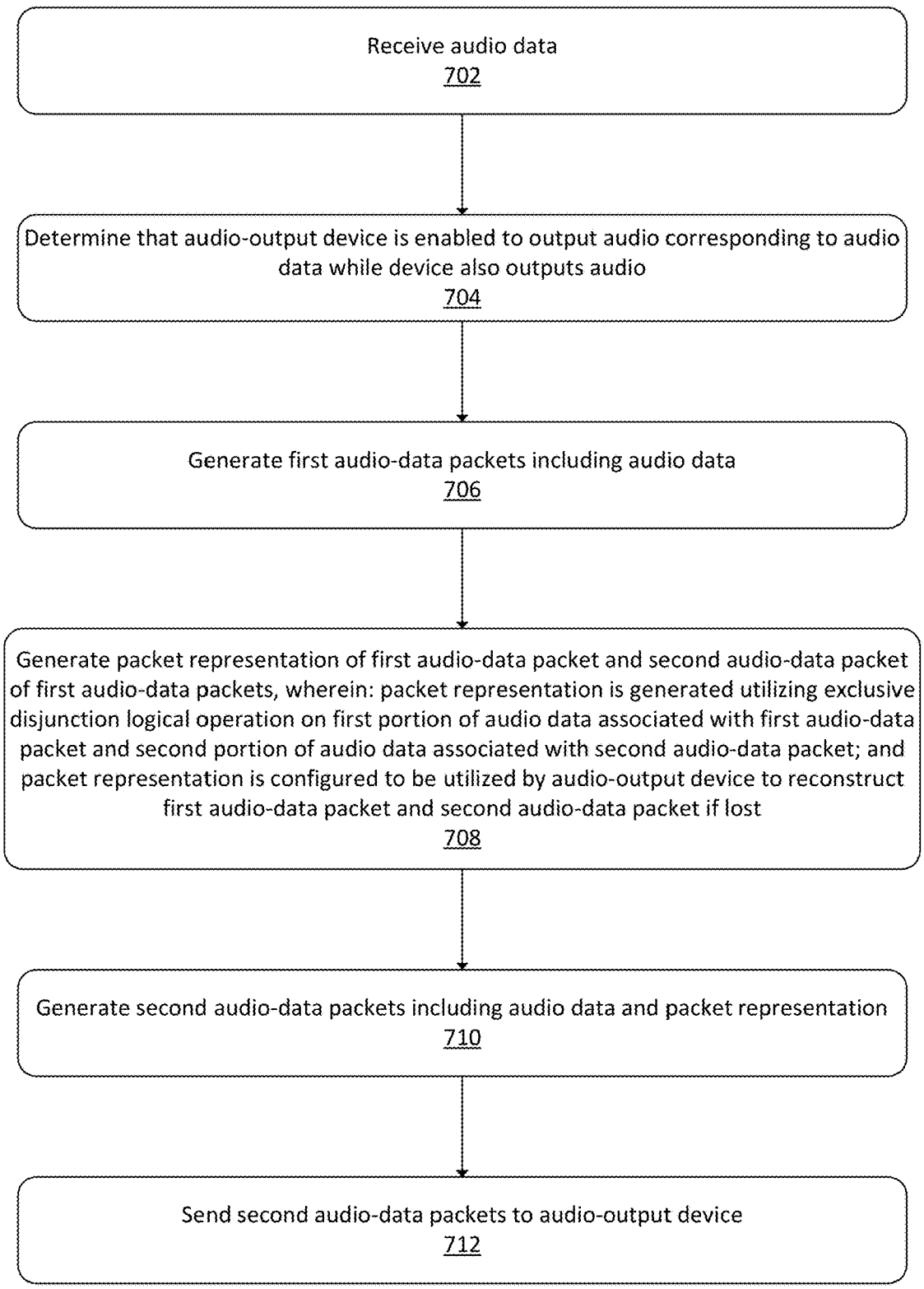
FIG. 7 illustrates a flow diagram of an example process for improved packet resiliency associated with a wireless data protocol.
Figure 8:
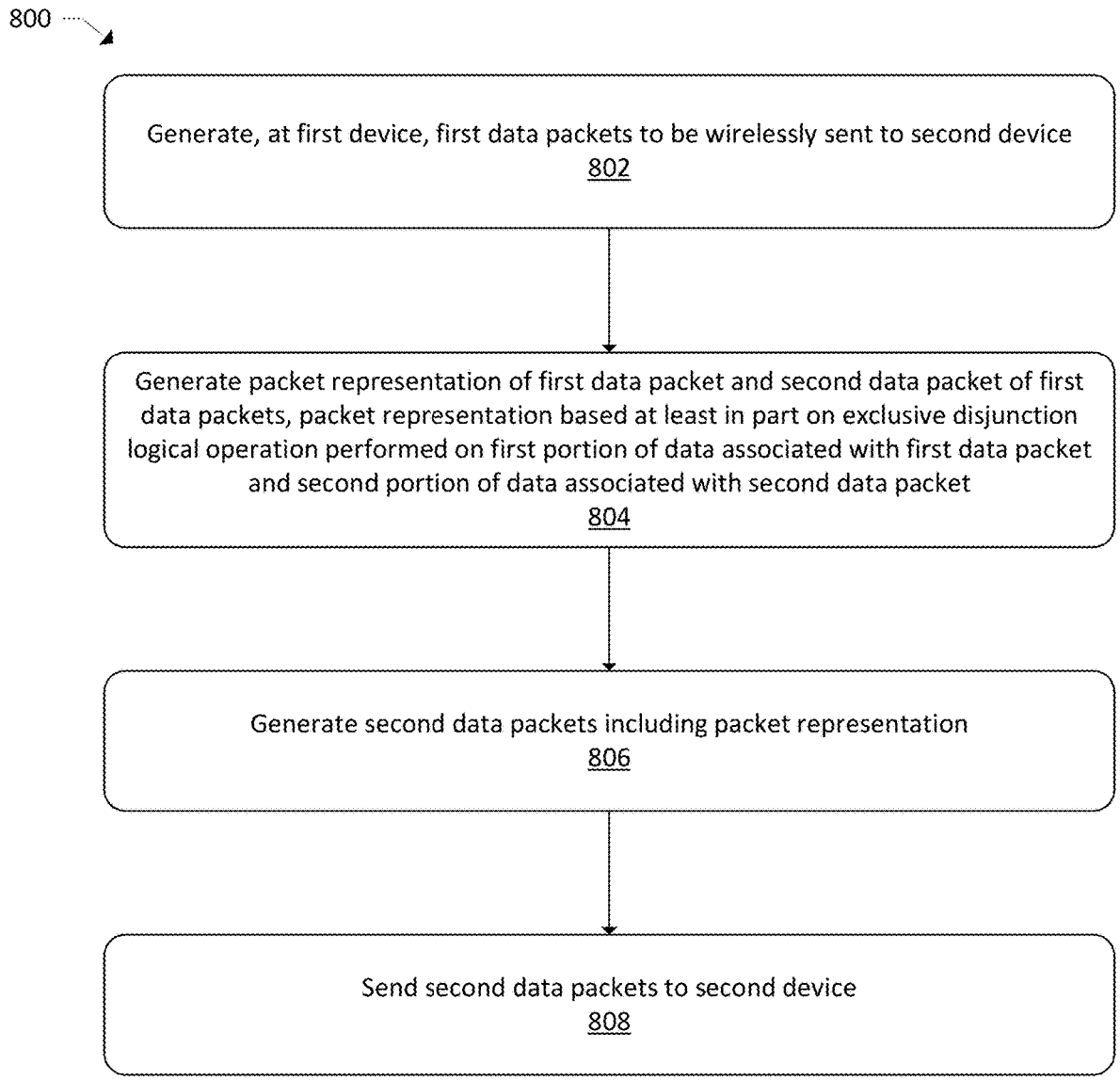
FIG. 8 illustrates a flow diagram of another example process for improved packet resiliency associated with a wireless data protocol.

FIGS. 6-8 illustrate processes for improved packet resiliency associated with a wireless data protocol. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5 and 9-13, although the processes may be implemented in a wide variety of other environments, architectures and systems.

FIG. 6 illustrates a flow diagram of an example process 600 for selecting a packet configuration for improved packet resiliency associated with a wireless data protocol. The order in which the operations or steps are described is not intended to be construed as a limitation, and any number of the described operations may be combined in any order and/or in parallel to implement process 600.

At block 602, the process 600 may include receiving content data. For example, a content component of the electronic device may be configured to receive the content data that is to be sent to the receiving device(s). That content data may be received, for example, from a remote system configured to provide the content data, such as in response to a user request for such content data. The user request may be in the form of a voice command, such as when the electronic device includes a voice user interface, and/or in the form of user input data corresponding to user input received at, for example, a graphical user interface of the electronic device.

At block 604, the process 600 may include determining whether a latency value associated with the content data satisfies a threshold latency value. For example, based at least in part on the content type and/or the request for the content data and/or the application and/or speechlet from which the content data was received, the electronic device may be configured to determine if the content data is prerecorded data or live streaming data and/or if the content data is of a type where latency can be introduced for the generation of packet representations using packet configurations of greater than +/−one packet. For example, prerecorded data may include movies, songs, television shows, etc. Live streaming data may include, for example, live communication channels such as synchronous communications between devices, live television programming, etc.

If the content data does not correspond to live streaming data, then at block 606 the process 600 may include determining whether consecutive packets are historically lost in association with a given receiving device. For example, the receiving device and/or the remote system may be configured to send packet-loss data to the electronic device indicating historical packet loss associated with the receiving device. That packet-loss data may indicate that when packets are lost, they are typically lost one at a time, two at a time or otherwise consecutively, three at a time, etc.

If consecutive packets are not historically lost and/or, in return to block 604, the content data does not correspond to live streaming data, then at block 608 the process 600 may include selecting a packet configuration associated with packet representations with one-packet spacing. In these examples, live streaming data may indicate that decreased latency in data transmission is favorable, and as such, a packet configuration with minimal latency in generating Xor data may be selected. Additionally, if packet-loss data indicates that consecutive packets are not historically lost, then utilizing the immediately preceding and following packets for generating Xor data should be sufficient for packet reconstruction at the receiving device.

If consecutive packets are historically lost, then at block 610 the process may include selecting a packet configuration associated with packet representations with more than one-packet spacing. For example, with the content data being prerecorded content data where some additional latency will not materially impact quality of content output, and where consecutive packets are lost frequently, selection of a packet configuration with intervening packets between the packets utilized for generating Xor data may be preferred. In these examples, consecutive lost packets will be easier to reconstruct and/or there may be more opportunities to reconstruct these lost packets utilizing this packet configuration.

At block 612, the process 600 may include generating packet representation data utilizing the selected packet configuration. For example, a FEC component may receive the data packets from the packet generator and may generate representations of data packets to append to the data in the data packets. For example, for a given data packet, the FEC component may generate a packet representation that includes a previous packet and a subsequent packet. That packet representation may be appended or otherwise included in the given packet at issue. For example, if five data packets, packets M1 through M5, are to be sent from the electronic device to the receiving device(s), each of the five data packets may have a packet representation appended to them. Take, for example, packet M4 which may include data that precedes the data in M5 and follows the data in M3. The FEC component may generate a representation of a preceding data packet, for example M3, and a subsequent data packet, for example M5. The representation may be generated utilizing an "exclusive or" (Xor) or otherwise an exclusive disjunction logical operation of the content data of M5 and M3.

At block 614, the process 600 may include generating data packets including the content data and the packet representation data. For example, the packet generator may utilize the Xor data and append that Xor data to the content data in the data packets prior to sending the data packets to the receiving data.

FIG. 7 illustrates a flow diagram of an example process 700 for improved packet resiliency associated with a wireless data protocol. The order in which the operations or steps are described is not intended to be construed as a limitation, and any number of the described operations may be combined in any order and/or in parallel to implement process 700.

At block 702, the process 700 may include receiving audio data, which may be a portion of content data that may also include image data. For example, a content component of the electronic device may be configured to receive the content data that is to be sent to the receiving device(s). That content data may be received, for example, from a remote system configured to provide the content data, such as in response to a user request for such content data. The user request may be in the form of a voice command, such as when the electronic device includes a voice user interface, and/or in the form of user input data corresponding to user input received at, for example, a graphical user interface of the electronic device.

At block 704, the process 700 may include determining that an audio-output device is enabled to output audio corresponding to the audio data while the device also outputs the audio. For example, a configuration component of the electronic device may be configured to determine a configuration of one or more of the receiving devices and/or of the electronic device. For example, the configuration component may be utilized to determine if one or more receiving devices are enabled for outputting at least a portion of the content, such as audio data, while the electronic device outputs images and/or another instance of the audio data. The configuration component may also be utilized to determine a number of the receiving devices and, thus, a number of instances of the audio data and/or portions of the audio data to send to the receiving devices. The configuration component may determine whether data packet generation as described herein may be initiated.

At block 706, the process 700 may include generating first audio-data packets including the audio data. For example, the packet generator may generate packets that include a header as discuss herein as well as a payload including portions of the data to be sent to the receiving device(s).

At block 708, the process 700 may include generating a packet representation of a first audio-data packet and a second audio-data packet of the first audio-data packets, wherein: the packet representation is generated utilizing an exclusive disjunction logical operation on a first portion of the audio data associated with the first audio-data packet and a second portion of the audio data associated with the second audio-data packet; and the packet representation is configured to be utilized by the audio-output device to reconstruct the first audio-data packet and the second audio-data packet if lost. For example, when generating the data packets, the FEC component may be utilized to control errors in data transmission between the electronic device and the receiving device(s). For example, the FEC component may encode the data packets and/or data included in the data packets in a redundant way, such as by utilizing error-correcting code that allows the receiving device(s) to detect errors in data transmission and to correct those errors without the electronic device having to send duplicate packets. Specifically, the FEC component may receive the data packets from the packet generator and may generate representations of data packets to append to the data in the data packets. For example, for a given data packet, the FEC component may generate a packet representation that includes a previous packet and a subsequent packet. That packet representation may be appended or otherwise included in the given packet at issue. For example, if five data packets, packets M1 through M5, are to be sent from the electronic device to the receiving device(s), each of the five data packets may have a packet representation appended to them. Take, for example, packet M4 which may include data that precedes the data in M5 and follows the data in M3. The FEC component may generate a representation of a preceding data packet, for example M3, and a subsequent data packet, for example M5. The representation may be generated utilizing an "exclusive or" (Xor) or otherwise an exclusive disjunction logical operation of the content data of M5 and M3. Such logical operations output as true only when inputs differ. Utilizing a simplified example, if the data associated with the M5 packet was represented as binary code of 10011, and M3 was represented as 11001, the representation of these packets utilizing the Xor logical operation would be 01010. This representation may be appended or otherwise added to data packet M4 before that packet is sent to the receiving device(s), and the representation may be described as Xor(M5,M3). The same process may be repeated for the other packets to be sent. For example, M5 may include Xor(M6,M4), M3 may include Xor(M4,M2), M2 may include Xor(M3,M1), and M1 may include Xor(M2,D), wherein D signifies a dummy packet.

Additionally, the FEC component may be utilized to select a packet configuration to be utilized for generating the packet representations. For example, the example packet configuration illustrated above includes generating packet representations from the packets immediately preceding and following the packet at issue. In other words, for packet M4, the packet representation is of packet M5 and packet M3. However, in other examples, the packet configuration may indicate that packets other than those immediately preceding and following a packet at issue are to be utilized for generating the packet representation. For example, for packet M4, the packet representation may be of packet M6 and packet M2. This alternative packet configuration may be useful in situations where consecutive packet loss frequently occurs with respect to a given receiving device, from a given electronic device, in a given environment, etc. This packet configuration may also be useful when the content being sent is prerecorded and can be buffered, for example at the buffer of the electronic device, for longer periods of time before being sent to the receiving device(s). For example, when a packet configuration is selected that indicates packets other than immediately preceding and following packets are to be utilized, the electronic device may wait until additional packets are received and/or generated before being able to use those packets for the representation generation. For example, if the packet configuration indicates that the M6 and M2 packets are to be utilized for the packet representation to be appended to packet M4, the FEC component may wait until the M6 packet is received and/or generated before being able to generate Xor(M6,M2) for packet M4. This introduced latency may be less desirable in situations where the content is, for example, live streaming content. By so doing, the FEC component and/or one or more other components of the electronic device may determine the content type to be sent to the receiving device(s) and/or the historical packet loss to select a packet configuration for generating the packet representations. In these and other examples, the buffer may be utilized to temporarily store data packets for use in generating the packet representations and generating the final packets to be sent to the receiving device(s). Other configurations such as Xor(Mn−1,Mn−2), Xor(Mn+1,Mn+2), Xor(Mn−2,Mn−4), and/or combinations thereof where multiple packet representations are appended to the same packet may be utilized.

At block 710, the process 700 may include generating second audio-data packets including the audio data and the packet representation. For example, the packet generator may be utilized to generate the final packets to be sent to the receiving device(s) with the packet representations appended thereto.

At block 712, the process 700 may include sending the second audio-data packets to the audio-output device. For example, the second audio-data packets may be sent from the electronic device to the audio-output device, which may receive the packets, determine if any packets have been lost, and if so utilize the Xor data to recover the lost packets.

Additionally, or alternatively, the process 700 may include determining, utilizing first data indicating historical packet loss associated with the audio-output device, that consecutive packet loss occurs more than non-consecutive packet loss at the audio-output device. The process 700 may also include selecting, from determining that consecutive packet loss occurs more than non-consecutive packet loss, a packet configuration to utilize in association with generating the packet representation, the packet configuration indicating that: the first audio-data packet has at least one first additional audio-data packet between the first audio-data packet and a third audio-data packet; and the second audio-data packet has at least one second additional audio-data packet between the second audio-data packet and the third audio-data packet.

Additionally, or alternatively, the process 700 may include determining, utilizing first data indicating historical packet loss associated with the audio-output device, that consecutive packet loss occurs less than non-consecutive packet loss at the audio-output device. The process 700 may also include selecting, from determining that consecutive packet loss occurs less than non-consecutive packet loss, a packet configuration to utilize in association with generating the packet representation, the packet configuration indicating that: the first audio-data packet is to immediately precede a third audio-data packet; and the second audio-data packet is to immediately follow the third audio-data packet. In these examples, generating the packet representation may include utilizing the packet configuration to generate the packet representation. In these examples, generating the packet representation may include utilizing the packet configuration to generate the packet representation.

Additionally, or alternatively, the process 700 may include determining a content data type associated with the content data, the content data type indicating that the content data is live streaming data. The process 700 may also include selecting, from the content data type, a packet configuration to utilize in association with generating the packet representation, the packet configuration indicating that: the first audio-data packet is to immediately precede a third audio-data packet; and the second audio-data packet is to immediately follow the third audio-data packet. In these examples, generating the packet representation may include utilizing the packet configuration to generate the packet representation.

FIG. 8 illustrates a flow diagram of another example process 800 for improved packet resiliency associated with a wireless data protocol. The order in which the operations or steps are described is not intended to be construed as a limitation, and any number of the described operations may be combined in any order and/or in parallel to implement process 800.

At block 802, the process 800 may include generating, at a first device, first data packets configured to be wirelessly sent to a second device. For example, the packet generator may generate packets that include a header as discuss herein as well as a payload including portions of the data to be sent to the receiving device(s).

At block 804, the process 800 may include generating a packet representation of a first data packet and a second data packet of the first data packets, the packet representation based at least in part on an exclusive disjunction logical operation performed on a first portion of data associated with the first data packet and a second portion of the data associated with the second data packet. For example, when generating the data packets, the FEC component may be utilized to control errors in data transmission between the electronic device and the receiving device(s). For example, the FEC component may encode the data packets and/or data included in the data packets in a redundant way, such as by utilizing error-correcting code that allows the receiving device(s) to detect errors in data transmission and to correct those errors without the electronic device having to send duplicate packets. Specifically, the FEC component may receive the data packets from the packet generator and may generate representations of data packets to append to the data in the data packets. For example, for a given data packet, the FEC component may generate a packet representation that includes a previous packet and a subsequent packet. That packet representation may be appended or otherwise included in the given packet at issue. For example, if five data packets, packets M1 through M5, are to be sent from the electronic device to the receiving device(s), each of the five data packets may have a packet representation appended to them. Take, for example, packet M4 which may include data that precedes the data in M5 and follows the data in M3. The FEC component may generate a representation of a preceding data packet, for example M3, and a subsequent data packet, for example M5. The representation may be generated utilizing an "exclusive or" (Xor) or otherwise an exclusive disjunction logical operation of the content data of M5 and M3. Such logical operations output as true only when inputs differ. Utilizing a simplified example, if the data associated with the M5 packet was represented as binary code of 10011, and M3 was represented as 11001, the representation of these packets utilizing the Xor logical operation would be 01010. This representation may be appended or otherwise added to data packet M4 before that packet is sent to the receiving device(s), and the representation may be described as Xor(M5,M3). The same process may be repeated for the other packets to be sent. For example, M5 may include Xor(M6,M4), M3 may include Xor(M4,M2), M2 may include Xor(M3,M1), and M1 may include Xor(M2,D), wherein D signifies a dummy packet.

Additionally, the FEC component may be utilized to select a packet configuration to be utilized for generating the packet representations. For example, the example packet configuration illustrated above includes generating packet representations from the packets immediately preceding and following the packet at issue. In other words, for packet M4, the packet representation is of packet M5 and packet M3. However, in other examples, the packet configuration may indicate that packets other than those immediately preceding and following a packet at issue are to be utilized for generating the packet representation. For example, for packet M4, the packet representation may be of packet M6 and packet M2. This alternative packet configuration may be useful in situations where consecutive packet loss frequently occurs with respect to a given receiving device, from a given electronic device, in a given environment, etc. This packet configuration may also be useful when the content being sent is prerecorded and can be buffered, for example at the buffer of the electronic device, for longer periods of time before being sent to the receiving device(s). For example, when a packet configuration is selected that indicates packets other than immediately preceding and following packets are to be utilized, the electronic device may wait until additional packets are received and/or generated before being able to use those packets for the representation generation. For example, if the packet configuration indicates that the M6 and M2 packets are to be utilized for the packet representation to be appended to packet M4, the FEC component may wait until the M6 packet is received and/or generated before being able to generate Xor(M6,M2) for packet M4. This introduced latency may be less desirable in situations where the content is, for example, live streaming content. By so doing, the FEC component and/or one or more other components of the electronic device may determine the content type to be sent to the receiving device(s) and/or the historical packet loss to select a packet configuration for generating the packet representations. In these and other examples, the buffer may be utilized to temporarily store data packets for use in generating the packet representations and generating the final packets to be sent to the receiving device(s). Other configurations such as Xor(Mn−1,Mn−2), Xor(Mn+1,Mn+2), Xor(Mn−2,Mn−4), and/or combinations thereof where multiple packet representations are appended to the same packet may be utilized.

At block 806, the process 800 may include generating second data packets including the packet representation. For example, the packet generator may be utilized to generate the final packets to be sent to the receiving device(s) with the packet representations appended thereto.

At block 808, the process 800 may include sending the second data packets to the second device. For example, the second audio-data packets may be sent from the electronic device to the audio-output device, which may receive the packets, determine if any packets have been lost, and if so utilize the Xor data to recover the lost packets.

Additionally, or alternatively, the process 800 may include receiving first data indicating that consecutive packet loss occurs more than non-consecutive packet loss at the second device. The process 800 may also include determining, based at least in part on the first data: the first data packet is to have at least one first additional data packet between the first data packet and a third data packet; and the second data packet is to have at least one second additional data packet between the second data packet and the third data packet. In these examples, generating the packet representation may be based at least in part on the packet configuration.

Additionally, or alternatively, the process 800 may include receiving, based at least in part on first data indicating that consecutive packet loss occurs less than non-consecutive packet loss at the second device. The process 800 may also include determining, based at least in part on the first data: the first data packet is to immediately precede a third data packet; and the second data packet is to immediately follow the third data packet. In these examples, generating the packet representation may be based at least in part on the packet configuration.

Additionally, or alternatively, the process 800 may include determining a data type associated with the data, the data type associated with a latency value that satisfies a threshold latency value. The process 800 may also include determining, based at least in part on the data type: the first data packet is to immediately precede a third data packet; and the second data packet to immediately follow the third data packet. In these examples, generating the packet representation may be based at least in part on the packet configuration.

Additionally, or alternatively, the process 800 may include determining a data type associated with the data, the data type associated with a latency value that does not satisfy a threshold latency value. The process 800 may also include based at least in part on the data type, selecting: the first data packet to have at least one first additional data packet between the first data packet and a third data packet; and the second data packet to have at least one second additional data packet between the second data packet and the third data packet. In these examples, generating the packet representation may be based at least in part on the packet configuration.

Additionally, or alternatively, the process 800 may include determining, from user account data associated with the first device, that the second device is enabled for outputting audio instead of the first device. In these examples, generating the second data packets may be based at least in part on the second device being enabled for outputting the audio instead of the first device.

Additionally, or alternatively, the process 800 may include determining a packet configuration to utilize for generating the representation, the packet configuration indicating a number of data packets between the first data packet and a third data packet. The process 800 may also include determining an amount of time to store the second data packets before sending the second data packets to the second device, the amount of time based at least in part on the packet configuration. In these examples, sending the second data packets to the second device may be performed after the amount of time has lapsed.

Additionally, or alternatively, the process 800 may include receiving, from the second device, first data indicating packet loss associated with the second data packets. The process 800 may also include selecting a second packet configuration based at least in part on the first data, the second packet configuration indicating a second number of the packets, wherein subsequent data packet generation for sending to the second device is based at least in part on the second packet configuration.

Figure 9:
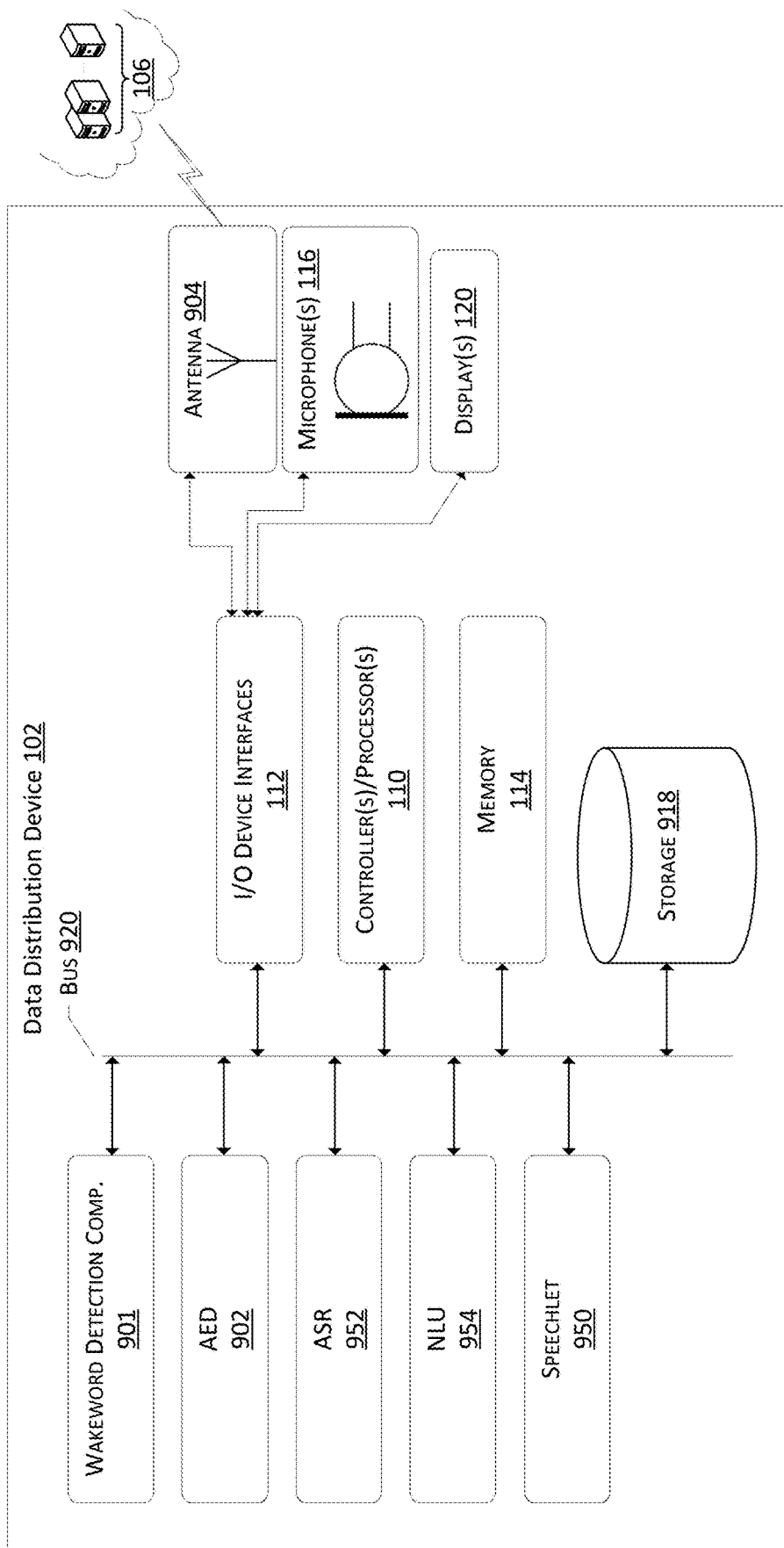
FIG. 9 illustrates a conceptual diagram of example components of an electronic device that may be utilized in association with improved packet resiliency associated with a wireless data protocol.

FIG. 9 illustrates a conceptual diagram of example components of an electronic device that may be utilized in association with improved packet resiliency associated with a wireless data protocol. The device 102 may be implemented as a standalone device 102 that is relatively simple in terms of functional capabilities with limited input/output components, memory, and processing capabilities. For instance, the device 102 may not have a keyboard, keypad, or other form of mechanical input. The device 102 may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the device 102. Nonetheless, the primary, and potentially only mode, of user interaction with the device 102 is through voice input and audible output. In some instances, the device 102 may simply comprise a microphone 116, a power source, and functionality for sending generated audio data via one or more antennas 904 to another device.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include a keyboard, a mouse, a display, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 116, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 9 may include one or more controllers/processors 110, that may include a central processing unit (CPU) for processing data and computer-readable instructions, and memory 114 for storing data and instructions of the device 102. The device 102 may also be connected to removable or external non-volatile memory and/or storage, such as a removable memory card, memory key drive, networked storage, etc., through input/output device interfaces 112.

Computer instructions for operating the device 102 and its various components may be executed by the device's controller(s)/processor(s) 110, using the memory 114 as temporary "working" storage at runtime. A device's computer instructions may be stored in a non-transitory manner in non-volatile memory 114, storage 918, or an external device(s). Alternatively, some or all of the executable instructions may be embedded in hardware or firmware on the device 102 in addition to or instead of software.

The device 102 may include input/output device interfaces 112. A variety of components may be connected through the input/output device interfaces 112. Additionally, the device 102 may include an address/data bus 920 for conveying data among components of the respective device. Each component within a device 102 may also be directly connected to other components in addition to, or instead of, being connected to other components across the bus 920.

The device 102 may include a display 120, which may comprise a touch interface. Any suitable display technology, such as liquid crystal display (LCD), organic light emitting diode (OLED), electrophoretic, and so on, may be utilized for the displays 120. Furthermore, the processor(s) 110 may comprise graphics processors for driving animation and video output on the associated display, or the device 102 may be "headless" and may primarily rely on spoken commands for input. As a way of indicating to a user that a connection between another device has been opened, the device 102 may be configured with one or more visual indicators, such as the light elements(s), which may be in the form of LED(s) or similar components (not illustrated), that may change color, flash, or otherwise provide visible light output, such as for a notification indicator on the device 102. The input/output device interfaces 112 that connect to a variety of components. This wired or a wireless audio and/or video port may allow for input/output of audio/video to/from the device 102. The device 102 may also include an audio capture component. The audio capture component may be, for example, a microphone 116 or array of microphones, a wired headset or a wireless headset, etc. The microphone 116 may be configured to capture audio. If an array of microphones is included, approximate distance to a sound's point of origin may be determined using acoustic localization based on time and amplitude differences between sounds captured by different microphones of the array. The device 102 (using microphone 116, wakeword detection component 901, ASR component 952, etc.) may be configured to generate audio data corresponding to captured audio. The device 102 (using input/output device interfaces 112, antenna 904, etc.) may also be configured to transmit the audio data to the remote system 106 for further processing or to process the data using internal components such as a wakeword detection component 901.

Via the antenna(s) 904, the input/output device interface 112 may connect to one or more networks 108 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s) 108, the speech-processing system may be distributed across a networked environment.

Accordingly, the device 102 and/or the remote system 106 may include an ASR component 952. The ASR component 952 of device 102 may be of limited or extended capabilities. The ASR component 952 may include language models stored in ASR model storage component, and an ASR component 952 that performs automatic speech recognition. If limited speech recognition is included, the ASR component 952 may be configured to identify a limited number of words, such as keywords detected by the device, whereas extended speech recognition may be configured to recognize a much larger range of words.

The device 102 and/or the remote system 106 may include a limited or extended NLU component 954. The NLU component 954 of device 102 may be of limited or extended capabilities. The NLU component 954 may comprise a name entity recognition module, an intent classification module and/or other components. The NLU component 954 may also include a stored knowledge base and/or entity library, or those storages may be separately located.

In examples, AED 902 may also be performed by the device 102. In these examples, the operations may include causing the AED component 902 to be enabled or otherwise turned on, or the operations may include causing the AED component 902 to transition from a first mode to a second mode representing a higher sensitivity to audio data generated by the microphone 116. The AED component 902 may utilize the audio data generated by the microphone 116 to determine if an audio fingerprint of the audio data, or portion thereof, corresponds to a reference audio fingerprint associated with the predefined event. For example, the one or more predefined events may be associated with one or more reference audio fingerprint characteristics of sound made when the event occurs. For example, the sound of a given person speaking may have a given audio fingerprint, the sound of a different person speaking may have another audio fingerprint, etc. The AED component 902 may receive an indication that audio has been captured and may utilize reference audio fingerprints for analysis in association with the audio fingerprint in question. It should be understood that while the term "audio fingerprint" is utilized herein, that term may include other terms such as "audio fingerprint" and/or "audio characteristics" and may correspond to characteristics of the audio data. For example, audio fingerprints may be generated utilizing a spectrogram that may split the audio data up over time and graphs frequency to amplitude over time. Peaks in frequency and/or amplitude may be identified in the spectrogram and may be utilized as characteristic points for comparison to reference audio fingerprints. The AED component 902 may determine that the audio fingerprint corresponds to at least one of the reference audio fingerprints, such as to a given confidence level, and may generate confirmatory data indicating that the audio fingerprint corresponds to the at least one reference audio fingerprint.

The device 102 and/or the remote system 106 may also include speechlet 950 that is configured to execute commands/functions associated with a spoken command as described herein. The device 102 may include a wake word engine, which may be a separate component or may be included in an ASR component 952. The wakeword detection component 901 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred. In examples, the device 102 and may not include speaker(s) 118 and may utilize speaker(s) of an external or peripheral device to output audio via the speaker(s) of the external/peripheral device.

Figure 10:
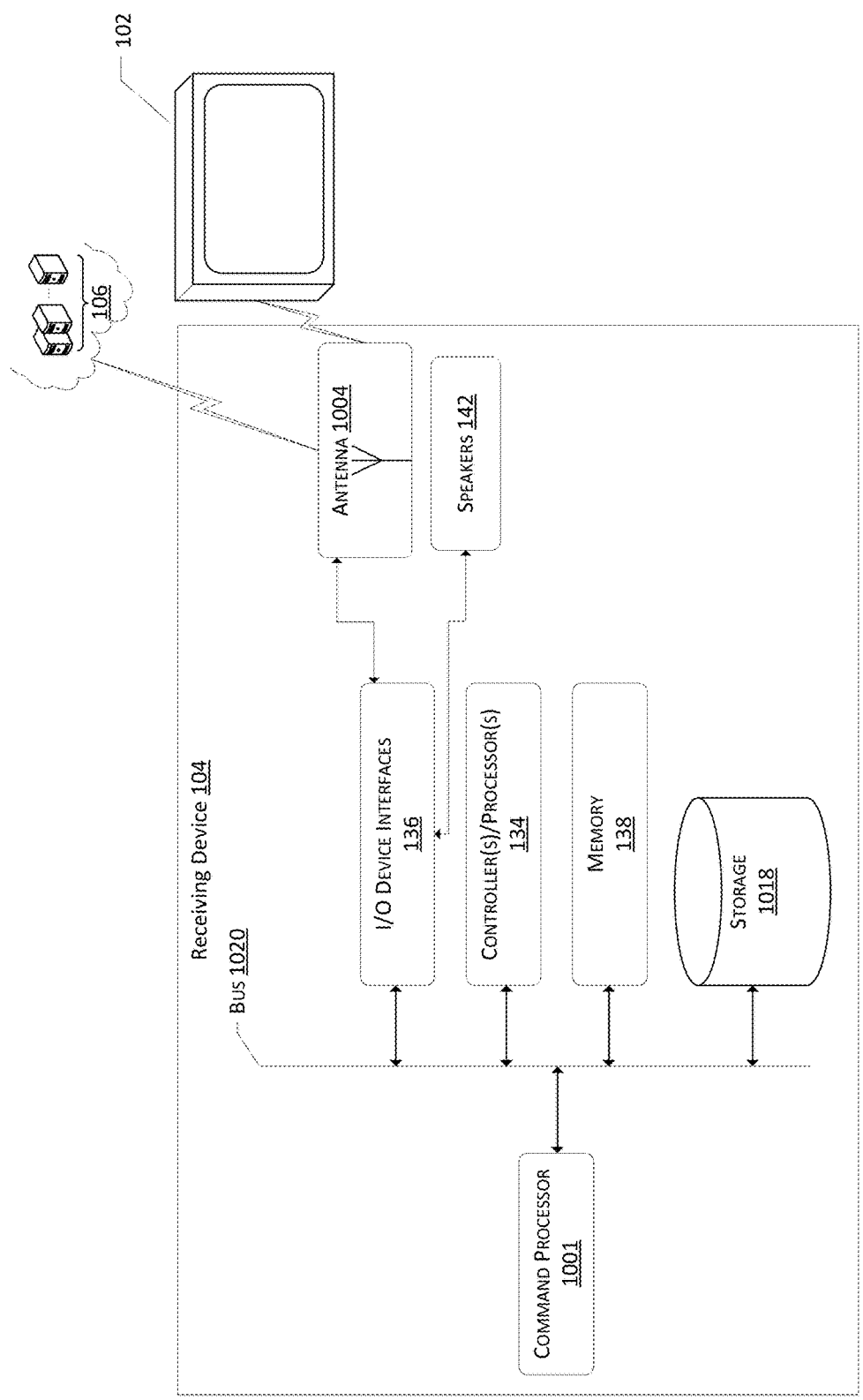
FIG. 10 illustrates a conceptual diagram of example components of a receiving device that may be utilized in association with improved packet resiliency associated with a wireless data protocol.

FIG. 10 illustrates a conceptual diagram of example components of receiving device 104 that may be utilized in association with improved packet resiliency associated with a wireless data protocol. For example, the device 104 may include a device that includes output means to output content, such as audio and/or images. The device 104 may be implemented as a standalone device that is relatively simple in terms of functional capabilities with limited input/output components, memory, and processing capabilities. For instance, the device 104 may not have a keyboard, keypad, touchscreen, or other form of mechanical input. In some instances, the device 104 may include a microphone, a power source, and functionality for sending generated audio data via one or more antennas 1004 to another device and/or system.

The device 104 of FIG. 10 may include one or more controllers/processors 134, that may include a central processing unit (CPU) for processing data and computer-readable instructions, and memory 138 for storing data and instructions of the device 104. In examples, the skills and/or applications described herein may be stored in association with the memory 138, which may be queried for content and/or responses as described herein. The device 104 may also be connected to removable or external non-volatile memory and/or storage, such as a removable memory card, memory key drive, networked storage, etc., through input/output device interfaces 136.

Computer instructions for operating the device 104 and its various components may be executed by the device's controller(s)/processor(s) 134, using the memory 138 as "working" storage at runtime. A device's computer instructions may be stored in a non-transitory manner in non-volatile memory 138, storage 1018, or an external device(s). Alternatively, some or all of the executable instructions may be embedded in hardware or firmware on the device 104 in addition to or instead of software.

The device 104 may include input/output device interfaces 136. A variety of components may be connected through the input/output device interfaces 136. Additionally, the device 104 may include an address/data bus 1020 for conveying data among components of the respective device. Each component within a device 104 may also be directly connected to other components in addition to, or instead of, being connected to other components across the bus 1020.

The processor(s) 134 may comprise graphics processors for driving animation and video output on the associated lights and/or displays. As a way of indicating to a user that a connection between another device has been opened, the device 104 may be configured with one or more visual indicators, such as light(s), which may be in the form of LED(s) or similar components (not illustrated), that may change color, flash, or otherwise provide visible light output, such as for a notification indicator on the device 104. The device 104 may also include an audio capture component. The audio capture component may be, for example, a microphone or array of microphones, a wired headset or a wireless headset, etc. The microphone may be configured to capture audio. If an array of microphones is included, approximate distance to a sound's point of origin may be determined using acoustic localization based on time and amplitude differences between sounds captured by different microphones of the array. The device 104 (using input/output device interfaces 136, antenna 1004, etc.) may also be configured to transmit audio data to the remote system 106 for processing.

Via the antenna(s) 1004, the input/output device interface 136 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 104 via wired connection to an external alternating current (AC) outlet, and/or via onboard power sources, such as batteries, solar panels, etc.

The device 104 and/or the remote system 106 may also include a command processor 1001 that is configured to execute commands/functions as described herein. For example, one or more commands may be received by the device 104 from the remote system 106 and/or from another device such as a user device and/or the audio-input device. The command processor 1001 may receive the commands and utilize the components of the device 104 to process those commands. Such commands may cause the device 106 to output sound, such as via speakers.

Figure 11:
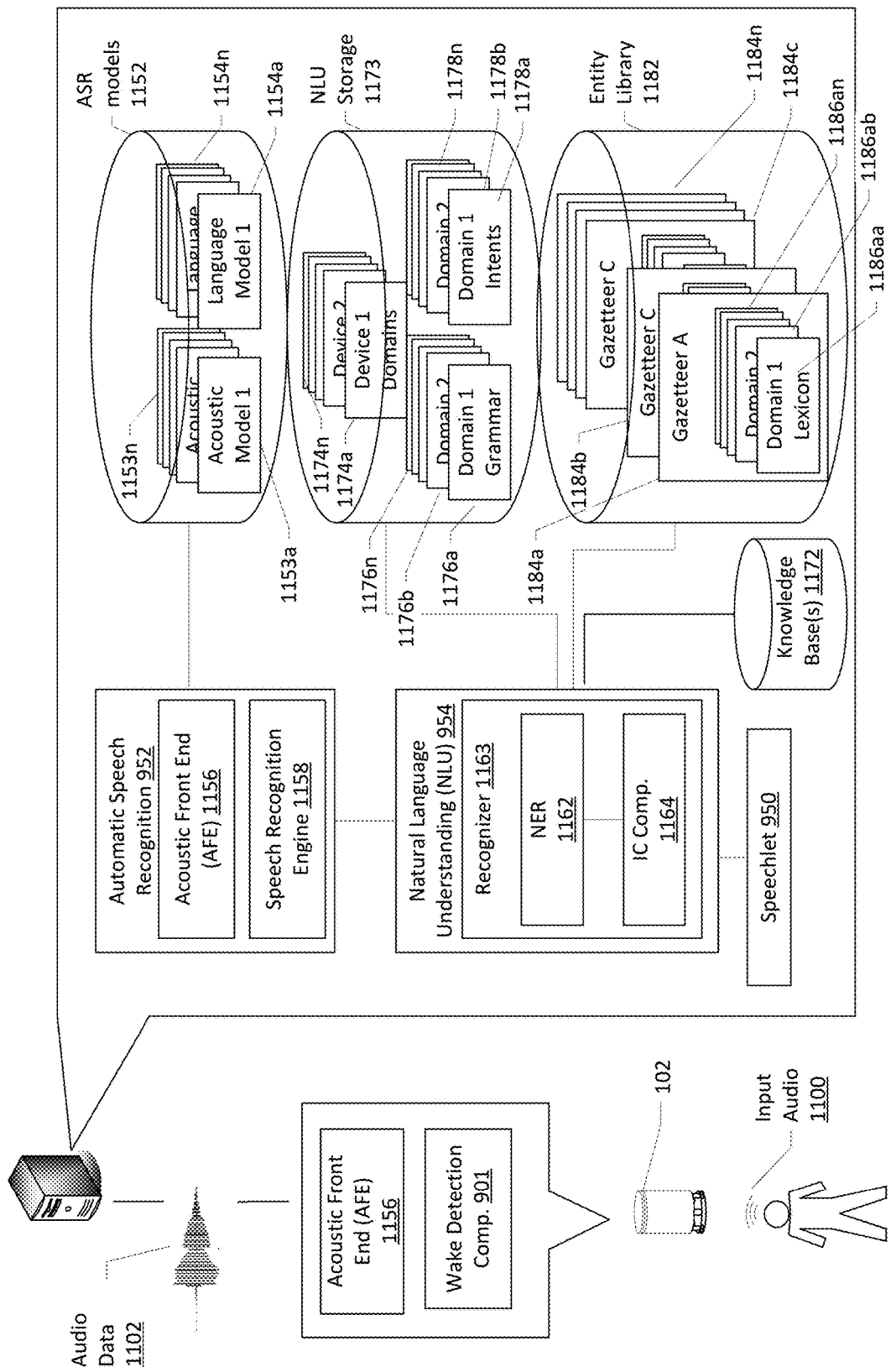
FIG. 11 illustrates a conceptual diagram of components of a speech-processing system for processing audio data provided by one or more devices.

FIG. 11 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 106). The various components illustrated may be located on a same device or different physical devices. Message between various components illustrated in FIG. 11 may occur directly or across a network 108. An audio capture component, such as a microphone 116 of the device 102, or another device, captures audio 1100 corresponding to a spoken utterance. The device 102, using a wake word engine 901, then processes audio data corresponding to the audio 1100 to determine if a keyword (such as a wakeword) is detected in the audio data. Following detection of a wakeword, the device 102 sends audio data 1102 corresponding to the utterance to the remote system 104 that includes an ASR component 952. The audio data 1102 may be output from an optional acoustic front end (AFE) 1156 located on the device prior to transmission. In other instances, the audio data 1102 may be in a different form for processing by a remote AFE 1156, such as the AFE 1156 located with the ASR component 952 of the remote system 106.

The wake word engine 901 works in conjunction with other components of the user device, for example a microphone to detect keywords in audio 1100. For example, the device may convert audio 1100 into audio data, and process the audio data with the wake word engine 901 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 901 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 901 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 1102 corresponding to input audio 1100 to the remote system 106 for speech processing. Audio data corresponding to that audio may be sent to remote system 106 for routing to a recipient device or may be sent to the remote system 106 for speech processing for interpretation of the included speech (either for purposes of enabling voice-messages and/or for purposes of executing a command in the speech). The audio data 1102 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 106, an ASR component 952 may convert the audio data 1102 into text. The ASR transcribes audio data into text data representing the words of the speech contained in the audio data 1102. The text data may then be used by other components for various purposes, such as executing system commands, inputting data, etc. A spoken utterance in the audio data is input to a processor configured to perform ASR which then interprets the utterance based on the similarity between the utterance and pre-established language models 1154 stored in an ASR model knowledge base (ASR Models Storage 1152). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1153 stored in an ASR Models Storage 1152), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 952 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1156 and a speech recognition engine 1158. The acoustic front end (AFE) 1156 transforms the audio data from the microphone into data for processing by the speech recognition engine 1158. The speech recognition engine 1158 compares the speech recognition data with acoustic models 1153, language models 1154, and other data models and information for recognizing the speech conveyed in the audio data. The AFE 1156 may reduce noise in the audio data and divide the digitized audio data into frames representing time intervals for which the AFE 1156 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1158 may process the output from the AFE 1156 with reference to information stored in speech/model storage (1152). Alternatively, post front-end processed data (such as feature vectors) may be received by the device executing ASR processing from another source besides the internal AFE. For example, the user device may process audio data into feature vectors (for example using an on-device AFE 1156) and transmit that information to a server across a network for ASR processing. Feature vectors may arrive at the remote system 106 encoded, in which case they may be decoded prior to processing by the processor executing the speech recognition engine 1158.

The speech recognition engine 1158 attempts to match received feature vectors to language phonemes and words as known in the stored acoustic models 1153 and language models 1154. The speech recognition engine 1158 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, play Video A?" The wake detection component may identify the wake word, otherwise described as a trigger expression, "Alexa," in the user utterance and may "wake" based on identifying the wake word. Audio data corresponding to the user utterance may be sent to the remote system 106, where the speech recognition engine 1158 may identify, determine, and/or generate text data corresponding to the user utterance, here "play Video A."

The speech recognition engine 1158 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1158 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 106, for natural language understanding (NLU) processing, such as conversion of the text into commands for execution, either by the user device, by the remote system 106, or by another device (such as a server running a specific application like a search engine, etc.).

The device performing NLU processing 954 (e.g., server 106) may include various components, including potentially dedicated processor(s), memory, storage, etc. As shown in FIG. 11, an NLU component 954 may include a recognizer 1163 that includes a named entity recognition (NER) component 1162 which is used to identify portions of query text that correspond to a named entity that may be recognizable by the system. A downstream process called named entity resolution links a text portion to a specific entity known to the system. To perform named entity resolution, the system may utilize gazetteer information (1184*a*-1184*n*) stored in entity library storage 1182. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 952 based on the utterance input audio 1100) and attempts to make a semantic interpretation of the text. That is, the NLU process determines the meaning behind the text based on the individual words and then implements that meaning. NLU processing 954 interprets a text string to derive an intent or a desired action from the user as well as the pertinent pieces of information in the text that allow a device (e.g., device 102) to complete that action. For example, if a spoken utterance is processed using ASR 952 and outputs the text "play Video A" the NLU process may determine that the user intended to have "Video A" output by one or more devices.

The NLU 954 may process several textual inputs related to the same utterance. For example, if the ASR 952 outputs N text segments (as part of an N-best list), the NLU may process all N outputs to obtain NLU results.

As will be discussed further below, the NLU process may be configured to parse and tag to annotate text as part of NLU processing. For example, for the text "play Video A," "play" may be tagged as a command (to output images and/or audio) and "Video A" may be tagged as the naming identifier of the content to be output.

To correctly perform NLU processing of speech input, an NLU process 954 may be configured to determine a "domain" of the utterance so as to determine and narrow down which services offered by the endpoint device (e.g., remote system 106 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1162 receives a query in the form of ASR results and attempts to identify relevant grammars and lexical information that may be used to construe meaning. To do so, the NLU component 954 may begin by identifying potential domains that may relate to the received query. The NLU storage 1173 includes a database of devices (1174*a*-1174*n*) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 1163, language model and/or grammar database (1176*a*-1176*n*), a particular set of intents/actions (1178*a*-1178*n*), and a particular personalized lexicon (1186). Each gazetteer (1184*a*-1184*n*) may include domain-indexed lexical information associated with a particular user and/or device. For example, the Gazetteer A (1184*a*) includes domain-index lexical information 1186*aa* to 1186*an*. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1164 parses the query to determine an intent or intents for each identified domain, where the intent corresponds to the action to be performed that is responsive to the query. Each domain is associated with a database (1178*a*-1178*n*) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1164 identifies potential intents for each identified domain by comparing words in the query to the words and phrases in the intents database 1178. In some instances, the determination of an intent by the IC component 1164 is performed using a set of rules or templates that are processed against the incoming text to identify a matching intent.

In order to generate a particular interpreted response, the NER 1162 applies the grammar models and lexical information associated with the respective domain to actually recognize a mention of one or more entities in the text of the query. In this manner, the NER 1162 identifies "slots" or values (i.e., particular words in query text) that may be needed for later command processing. Depending on the complexity of the NER 1162, it may also label each slot with a type of varying levels of specificity (such as noun, place, device name, device location, city, artist name, song name, amount of time, timer number, or the like). Each grammar model 1176 includes the names of entities (i.e., nouns) commonly found in speech about the particular domain (i.e., generic terms), whereas the lexical information 1186 from the gazetteer 1184 is personalized to the user(s) and/or the device. For instance, a grammar model associated with the shopping domain may include a database of words commonly used when people discuss shopping.

The intents identified by the IC component 1164 are linked to domain-specific grammar frameworks (included in 1176) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (1176) framework or frameworks may correspond to sentence structures such as "purchase item called 'Item A' from Marketplace A."

For example, the NER component 1162 may parse the query to identify words as subject, object, verb, preposition, etc., based on grammar rules and/or models, prior to recognizing named entities. The identified verb may be used by the IC component 1164 to identify intent, which is then used by the NER component 1162 to identify frameworks. A framework for the intent of "play a song," meanwhile, may specify a list of slots/fields applicable to play the identified "song" and any object modifier (e.g., specifying a music collection from which the song should be accessed) or the like. The NER component 1162 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1162 may search the database of generic words associated with the domain (in the knowledge base 1172). So, for instance, if the query was "identify this song," after failing to determine which song is currently being output, the NER component 1162 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 950. The destination speechlet 950 may be determined based on the NLU output. For example, if the NLU output includes a command to send a message, the destination speechlet 950 may be a message sending application, such as one located on the user device or in a message sending appliance, configured to execute a message sending command. If the NLU output includes a search request, the destination application 136 may include a search engine processor, such as one located on a search server, configured to execute a search command. After the appropriate command is generated based on the intent of the user, the speechlet 950 may provide some or all of this information to a text-to-speech (TTS) engine. The TTS engine may then generate an actual audio file for outputting the audio data determined by the application 136 (e.g., "okay," or "Video A playing"). After generating the file (or "audio data"), the TTS engine may provide this data back to the remote system 106.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 144 during runtime operations where NLU operations are performed on text (such as text output from an ASR component 952). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1163. Each recognizer may include various NLU components such as an NER component 1162, IC component 1164 and other components such as an entity resolver, or other components.

For example, a messaging domain recognizer 1163-A (Domain A) may have an NER component 1162-A that identifies what slots (i.e., portions of input text) may correspond to particular words relevant to that domain. The words may correspond to entities such as (for the messaging domain) a recipient. An NER component 1162 may use a machine learning model, such as a domain specific conditional random field (CRF) to both identify the portions corresponding to an entity as well as identify what type of entity corresponds to the text portion. The messaging domain recognizer 1163-A may also have its own intent classification (IC) component 1164-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 104 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 106, as illustrated herein are exemplary, and may be located in a stand-alone device or may be included, in whole or in part, as a component of a larger device or system, may be distributed across a network or multiple devices connected by a network, etc.

Figure 12:
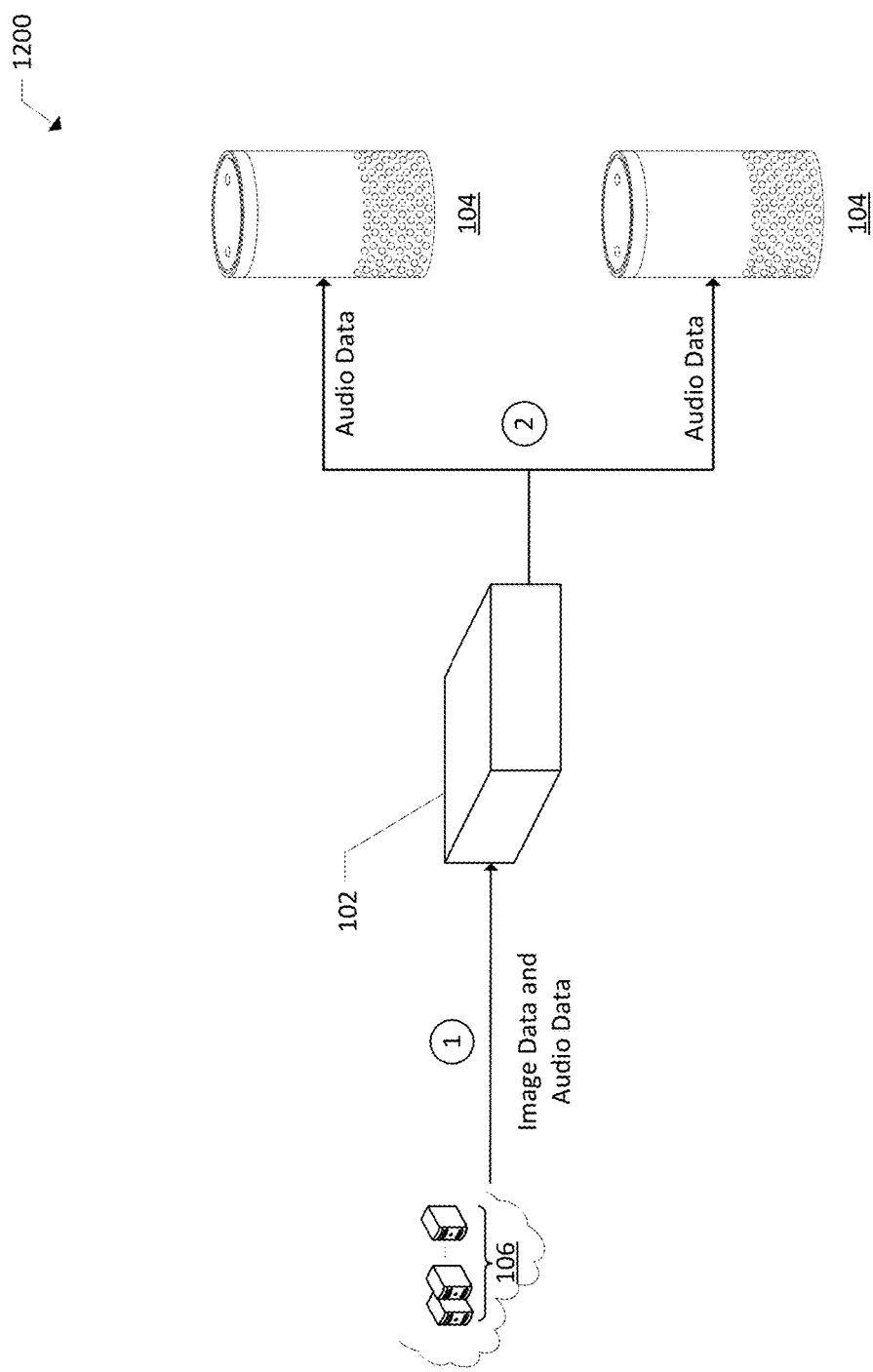
FIG. 12 illustrates a conceptual diagram of example devices utilized for outputting audio in a time-synchronous manner with each other and/or with display of images.

FIG. 12 illustrates a conceptual diagram of example devices utilized for outputting audio in a time-synchronous manner with each other and/or with display of images. The system 1200 may include at least some of the components of the system 100 from FIG. 1. For example, the system 1200 may include an electronic device 102 and/or one or more receiving devices 104 and/or a remote system 106. FIG. 12 depicts the exchange of information and/or the performance of processes via the various components utilizing steps 1 and 2. However, it should be understood that the processes may be performed in any order and need not be performed in sequential order as depicted in FIG. 12.

At step 1, content data, such as image data and audio data, may be sent from the remote system 106 to the electronic device 102. By way of example, a user may request that content may be displayed and/or otherwise output utilizing devices located in an environment. The request may be from user input to, for example, a personal device such as a mobile phone, tablet, and/or computer, and/or the request may be from a user utterance spoken by the user and captured by a microphone of one or more of the devices within the environment. For example, a user may provide input indicating an intent to play a video associated with a movie on a television within the environment while one or more other devices output audio of the movie. Input data corresponding to the input may be sent to, for example, the remote system 106 configured to retrieve content associated with the request. In examples where the input comprises a user utterance, audio data corresponding to the user utterance may be sent to the remote system 106. A speech-processing system may generate intent data indicating an intent associated with the user utterance. In the example where the user utterance indicates an intent to output content on the one or more devices, a speechlet may receive the intent data and/or a payload associated with the intent data and may utilize that information to determine what content is to be provided to the device 102 for output. A retrieval component may retrieve the requested content and the remote system 106 may send the content to the electronic device 102. The content, in a given example may include image data and audio data. In other examples, the content may include just image data, just audio data, and/or other types of data.

At step 2, the electronic device 102 may send data packets, such as audio-data packets to the receiving devices 104. For example, the electronic device 102 may receive the content data and may send all or a portion of the content data to the receiving devices 104. In these examples, the data may be sent to the receiving devices 104 as data packets utilizing one or more protocols.

The electronic device 102 and/or the receiving devices 104 may utilize associations between time kept by the electronic device 102 and time kept by the receiving devices 104 to determine how and when to send packets to the receiving devices 104 such that the video is output by the electronic device 102 and/or another device having a video interface in a time-synchronous manner with output of the audio on the receiving devices 104.

Figure 13:
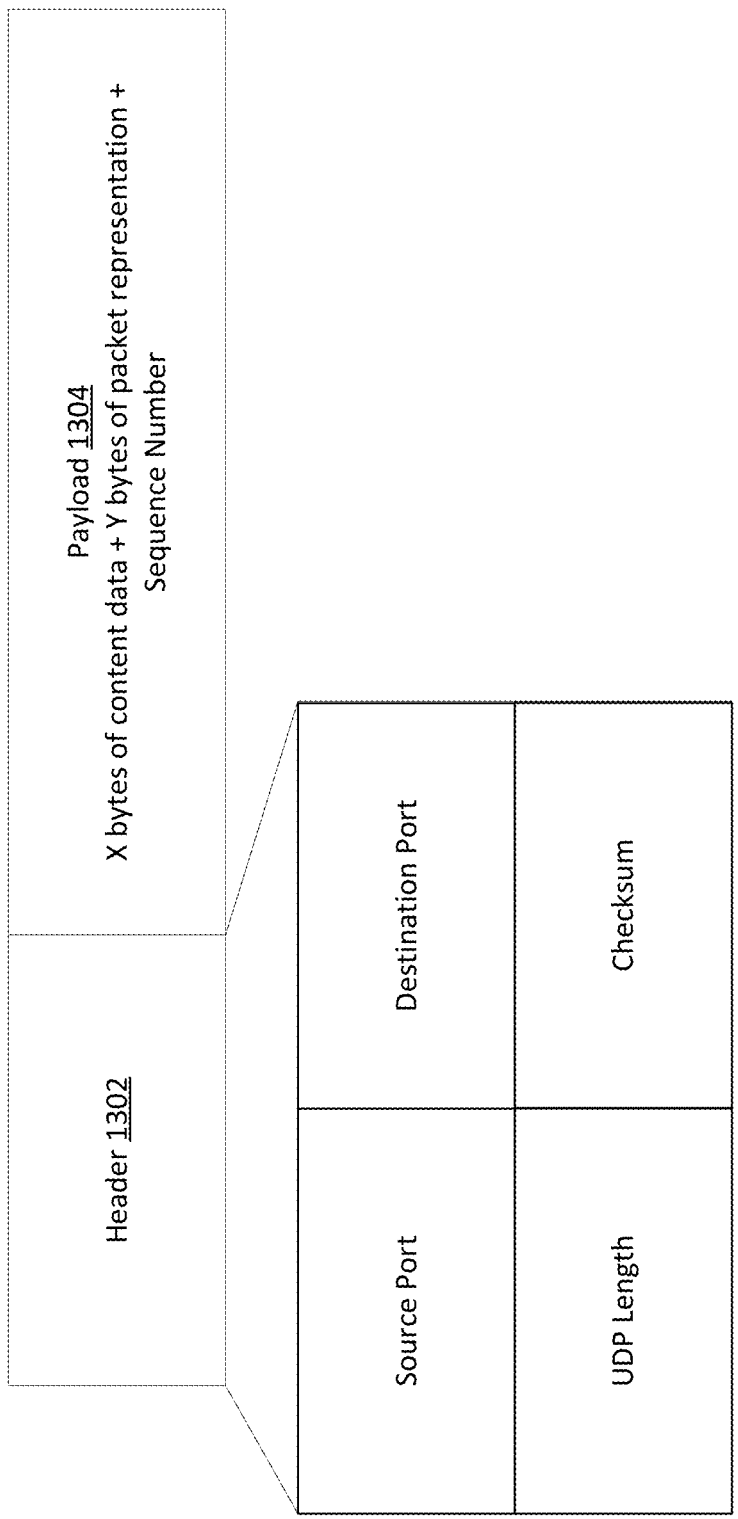
FIG. 13 illustrates a conceptual diagram of an example data packet utilized for a wireless data protocol.

FIG. 13 illustrates a conceptual diagram of an example data packet utilized for a wireless data protocol.

A given data packet may include a header 1302 and a payload 1304. The header 1302 may include control information and the payload 1304 may include the content data to be transmitted between devices as well as packet representations as described more fully herein. The control information of the header 1302 may include information such as source port information, destination port information, UDP length, and a checksum. The payload 1304 may include bytes of the content data to be sent from a sending device to a receiving device. The transmission unit size of the data packets may be utilized to determine how to split up the content data between packets and how many packets are to be sent. As described herein, the payload 1304 may also include the packet representation of two other packets, which may include Xor data generated by a FEC component and appended to the content data. In examples, the Xor data may be the same or a similar length as the content data. In these examples, the size of the payload 1304 of the packet may double in size and/or the payload size may remain the same but the amount of content data may be reduced by approximately half. The payload 1304 may also include a sequence number for the packet at issue as well as other data such as data indicating a length of the audio data, length of packet representations, and/or other data that may assist in sharing the details of the payload.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A device, comprising:
   one or more processors; and
   non-transitory computer-readable media storing computer-executable instructions that, when executed by the one or more processors, cause the one or more processors to perform operations comprising:
   receiving audio data;
   determining that an audio-output device is enabled to output audio corresponding to the audio data while the device also outputs the audio;
   generating first audio-data packets including the audio data;
   receiving first data indicating that consecutive packet loss occurs more than non-consecutive packet loss at the audio-output device;
   determining, based at least in part on the first data, a packet spacing associated with a first audio-data packet and a second audio-data packet of the first audio-data packets;
   generating a packet representation of the first audio-data packet and the second audio-data packet based at least in part on the packet spacing, wherein:
     the packet representation is generated utilizing an exclusive disjunction logical operation on a first portion of the audio data associated with the first audio-data packet and a second portion of the audio data associated with the second audio-data packet; and
     the packet representation is configured to be utilized by the audio-output device to reconstruct the first audio-data packet and the second audio-data packet if lost;
   generating second audio-data packets including the audio data and the packet representation; and
   sending the second audio-data packets to the audio-output device.

2. The device of claim 1, the operations further comprising:
   determining, utilizing second data indicating historical packet loss associated with the audio-output device, that consecutive packet loss occurs more than non-consecutive packet loss at the audio-output device;
   selecting, from determining that consecutive packet loss occurs more than non-consecutive packet loss, a packet configuration to utilize in association with generating the packet representation, the packet configuration indicating that:
     the first audio-data packet has at least one first additional audio-data packet between the first audio-data packet and a third audio-data packet; and
     the second audio-data packet has at least one second additional audio-data packet between the second audio-data packet and the third audio-data packet; and wherein generating the packet representation includes utilizing the packet configuration to generate the packet representation.

3. The device of claim 1, the operations further comprising:
determining, utilizing second data indicating historical packet loss associated with the audio-output device, that consecutive packet loss occurs less than non-consecutive packet loss at the audio-output device;
selecting, from determining that consecutive packet loss occurs less than non-consecutive packet loss, a packet configuration to utilize in association with generating the packet representation, the packet configuration indicating that:
the first audio-data packet is to immediately precede a third audio-data packet; and
the second audio-data packet is to immediately follow the third audio-data packet; and
wherein generating the packet representation includes utilizing the packet configuration to generate the packet representation.

4. The device of claim 1, the operations further comprising:
determining a content data type associated with the content data, the content data type indicating that the content data is live streaming data;
selecting, from the content data type, a packet configuration to utilize in association with generating the packet representation, the packet configuration indicating that:
the first audio-data packet is to immediately precede a third audio-data packet; and
the second audio-data packet is to immediately follow the third audio-data packet; and
wherein generating the packet representation includes utilizing the packet configuration to generate the packet representation.

5. A method, comprising:
generating, at a first device, first data packets to be wirelessly sent to a second device;
receiving first data indicating packet loss associated with the second device;
determining, based at least in part on the first data, a packet spacing associated with a first data packet and a second data packet of the first data packets;
generating a packet representation of the first data packet and the second data packet based at least in part on the packet spacing, the packet representation based at least in part on an exclusive disjunction logical operation performed on a first portion of data associated with the first data packet and a second portion of the data associated with the second data packet;
generating second data packets including the packet representation; and
sending the second data packets to the second device.

6. The method of claim 5, further comprising:
determining that the first data packets are to be sent to a third device;
determining that the third device is associated with a device configuration of the second device; and
wherein the second data packets including the packet representation are sent to the third device based at least in part on the third device being associated with the device configuration.

7. The method of claim 5, further comprising:
receiving, after sending the second data packets, second data indicating that consecutive packet loss occurs less than non-consecutive packet loss at the second device; and
determining, based at least in part on the first data:
the first data packet is to immediately precede a third data packet; and
the second data packet is to immediately follow the third data packet.

8. The method of claim 5, further comprising:
determining a data type associated with the data, the data type associated with a latency value that satisfies a threshold latency value; and
determining, based at least in part on the data type:
the first data packet is to immediately precede a third data packet; and
the second data packet to immediately follow the third data packet.

9. The method of claim 5, further comprising:
determining a data type associated with the data, the data type associated with a latency value that does not satisfy a threshold latency value; and
based at least in part on the data type, selecting:
the first data packet to have at least one first additional data packet between the first data packet and a third data packet; and
the second data packet to have at least one second additional data packet between the second data packet and the third data packet.

10. The method of claim 5, further comprising:
determining, from user account data associated with the first device, that the second device is enabled for outputting audio instead of the first device; and
wherein generating the second data packets comprises generating the second data packets based at least in part on the second device being enabled for outputting the audio instead of the first device.

11. The method of claim 5, further comprising:
determining an amount of time to store the second data packets before sending the second data packets to the second device, the amount of time based at least in part on the packet spacing; and
wherein sending the second data packets to the second device comprises sending the second data packets to the second device after the amount of time has lapsed.

12. The method of claim 5, wherein the packet representation is generated based at least in part on a first packet configuration, and the method further comprises:
receiving, from the second device, second data indicating packet loss associated with the second data packets; and
selecting a second packet configuration based at least in part on the first data, wherein subsequent data packet generation for sending to the second device is based at least in part on the second packet configuration.

13. A device, comprising:
one or more processors; and
non-transitory computer-readable media storing computer-executable instructions that, when executed by the one or more processors, cause the one or more processors to perform operations comprising:
generating, at a first device, first data packets to be wirelessly sent to a second device;
receiving first data indicating packet loss associated with the second device;

determining, based at least in part on the first data, a packet spacing associated with a first data packet and a second data packet of the first data packets;

generating a packet representation of the first data packet and the second data packet based at least in part on the packet spacing, the packet representation based at least in part on an exclusive disjunction logical operation performed on a first portion of data associated with the first data packet and a second portion of the data associated with the second data packet;

generating second data packets including the packet representation; and sending the second data packets to the second device.

14. The device of claim 13, the operations further comprising:

receiving, after sending the second data packets, second data indicating that consecutive packet loss occurs more than non-consecutive packet loss at the second device; and determining, based at least in part on the first data:
the first data packet is to have at least one first additional data packet between the first data packet and a third data packet; and
the second data packet is to have at least one second additional data packet between the second data packet and the third data packet.

15. The device of claim 13, the operations further comprising:

receiving, after sending the second data packets, second data indicating that consecutive packet loss occurs less than non-consecutive packet loss at the second device; and determining, based at least in part on the first data:
the first data packet is to immediately precede a third data packet; and
the second data packet is to immediately follow the third data packet.

16. The device of claim 13, the operations further comprising:

determining a data type associated with the data, the data type associated with a latency value that satisfies a threshold latency value; and determining, based at least in part on the data type:
the first data packet is to immediately precede a third data packet; and
the second data packet to immediately follow the third data packet.

17. The device of claim 13, the operations further comprising:

determining a data type associated with the data, the data type associated with a latency value that does not satisfy a threshold latency value; and based at least in part on the data type, selecting:
the first data packet to have at least one first additional data packet between the first data packet and a third data packet; and
the second data packet to have at least one second additional data packet between the second data packet and the third data packet.

18. The device of claim 13, the operations further comprising:

determining, from user account data associated with the first device, that the second device is enabled for outputting audio instead of the first device; and wherein generating the first data packets comprises generating the first data packets based at least in part on the second device being enabled for outputting the audio instead of the device.

19. The device of claim 13, the operations further comprising:

determining an amount of time to store the second data packets before sending the second data packets to the second device, the amount of time based at least in part on the packet spacing; and wherein sending the second data packets to the second device comprises sending the second data packets to the second device after the amount of time has lapsed.

20. The device of claim 13, wherein the packet representation is generated based at least in part on a first packet configuration, and the operations further comprise:

receiving, from the second device, second data indicating packet loss associated with the second data packets; and selecting a second packet configuration based at least in part on the second data, wherein subsequent data packet generation for sending to the second device is based at least in part on the second packet configuration.

* * * * *